(12) United States Patent
Tanaka et al.

(10) Patent No.: US 12,701,466 B2
(45) Date of Patent: Aug. 4, 2026

(54) COMMUNICATION SYSTEM, COMMUNICATION DEVICE, COMMUNICATION METHOD, AND COMPUTER PROGRAM PRODUCT

(71) Applicant: KABUSHIKI KAISHA TOSHIBA, Tokyo (JP)

(72) Inventors: Yasuyuki Tanaka, Kawasaki Kanagawa (JP); Masaki Mukamoto, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 426 days.

(21) Appl. No.: 18/174,633

(22) Filed: Feb. 26, 2023

(65) Prior Publication Data

US 2023/0413113 A1 Dec. 21, 2023

(30) Foreign Application Priority Data

Jun. 17, 2022 (JP) ................................. 2022-098294

(51) Int. Cl.
| | |
|---|---|
| *H04W 28/08* | (2023.01) |
| *H04W 28/086* | (2023.01) |
| *H04W 72/29* | (2023.01) |

(52) U.S. Cl.
CPC ....... *H04W 28/0864* (2023.05); *H04W 72/29* (2023.01)

(58) Field of Classification Search
CPC .. H04W 28/0864; H04W 72/29; H04W 84/22
See application file for complete search history.

(56) References Cited

U.S. PATENT DOCUMENTS 9,357,583 B2 * 5/2016 Ibuki ..................... H04W 84/18
11,272,421 B2 3/2022 Iwata
(Continued)

FOREIGN PATENT DOCUMENTS

| JP | 2008-245102 A | 10/2008 |
|---|---|---|
| JP | 2013-162423 A | 8/2013 |
(Continued)

OTHER PUBLICATIONS

T. Winter et al., Eds., "RPL: IPV6 Routing Protocol for Low-Power and Lossy Networks," IETF RFC 6550, 157 pages, URL: https://tools.ietf.org/html/rfc6550 (2012).
(Continued)

*Primary Examiner* — Steven Hieu D Nguyen
(74) *Attorney, Agent, or Firm* — Finnegan, Henderson, Farabow, Garrett & Dunner, LLP

(57) ABSTRACT

According to one embodiment, a communication system includes first nodes and a second node constituting a multihop network in collaboration with each other. The second node is capable of communicating with a server device via a lower-level network and a mobile gateway. The server device is connected to a higher-level network. The second node manages schedule information. The schedule information contains communicable-period information that indicates a communicable period during which the gateway is present within the communication range enabling communication with the second node via the lower-level network. The second node transmits first communication data addressed to the server device. The first communication data is transmitted to the server device via the lower-level network and the gateway in the communicable period indicated by the communicable-period information.

8 Claims, 14 Drawing Sheets

1B

(56)    References Cited

U.S. PATENT DOCUMENTS

| | | | |
|---|---|---|---|
| 12,200,672 B1 * | 1/2025 | Volkerink | H04W 72/0446 |
| 2003/0058826 A1 * | 3/2003 | Shearer, III | H04W 74/02 |
| | | | 370/442 |
| 2013/0201970 A1 | 8/2013 | Fujita et al. | |
| 2013/0208622 A1 * | 8/2013 | Ibuki | H04W 84/18 |
| | | | 370/254 |
| 2013/0279410 A1 * | 10/2013 | Dublin, III | H04L 45/127 |
| | | | 370/328 |
| 2018/0077650 A1 | 3/2018 | Nakahara | |
| 2019/0069241 A1 * | 2/2019 | Gilson | H04W 52/0241 |
| 2021/0377980 A1 | 12/2021 | Fujishiro et al. | |
| 2023/0345456 A1 * | 10/2023 | Dees | H04L 47/30 |

FOREIGN PATENT DOCUMENTS

| | | |
|---|---|---|
| JP | 2018-46382 A | 3/2018 |
| JP | 6345561 B2 | 6/2018 |
| JP | 2020-87258 A | 6/2020 |
| JP | 2022-17555 A | 1/2022 |
| WO | WO 2019/059386 A1 | 3/2019 |

OTHER PUBLICATIONS

Japan Patent Office, Office Action in JP App. No. 2022-098294, (Aug. 5, 2025).

* cited by examiner

| COMMUNICABLE-PERIOD INFORMATION | |
|---|---|
| CONNECTION DATE/ TIME | DISCONNECTION DATE/TIME |
| 04/10/2022 11:00 | 04/10/2022 13:00 |
| 04/12/2022 1:00 | 04/13/2022 20:00 |
| 04/13/2022 21:00 | 04/13/2022 22:00 |
| 04/15/2022 12:00 | 04/15/2022 13:00 |
| 04/15/2022 15:30 | 04/15/2022 16:00 |
| 04/16/2022 9:00 | 04/16/2022 11:00 |
| 04/16/2022 12:00 | 04/16/2022 13:00 |

| COMMUNICABLE-PERIOD INFORMATION | | LOWER-LEVEL NW IDEN-TIFICATION INFORMATION |
|---|---|---|
| CONNECTION DATE/TIME | DISCONNECTION DATE/TIME | |
| 04/10/2022 11:00 | 04/10/2022 13:00 | a |
| 04/11/2022 11:00 | 04/11/2022 13:00 | b |
| 04/11/2022 14:00 | 04/11/2022 15:00 | b |
| 04/12/2022 1:00 | 04/13/2022 20:00 | a |
| 04/13/2022 21:00 | 04/13/2022 22:00 | a |
| 04/14/2022 21:00 | 04/14/2022 22:00 | b |
| 04/14/2022 21:00 | 04/14/2022 22:00 | b |
| 04/15/2022 12:00 | 04/15/2022 13:00 | a |
| 04/15/2022 15:30 | 04/15/2022 16:00 | a |
| 04/16/2022 9:00 | 04/16/2022 11:00 | a |
| 04/16/2022 12:00 | 04/16/2022 13:00 | a |

COMMUNICATION SYSTEM, COMMUNICATION DEVICE, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2022-098294, filed on Jun. 17, 2022; the entire contents of which are incorporated herein by reference.

FIELD

Embodiments described herein relate generally to a communication system, a communication device, a communication method, and a computer program product.

BACKGROUND

A configuration has been known, in which a gateway functioning as a relay between a multihop network and a higher-level network moves through the real space. In such a configuration, during a period of time in which the gateway is present at a position enabling communication with the multihop network, the communication data sent from the multihop network reaches the gateway. On the other hand, during a period of time in which the gateway is placed at a position from which communication with the multihop network is not possible, the communication data sent from the multihop network toward the gateway does not reach the gateway, and sometimes results in unnecessary power consumption.

In the specifications related to multihop networks, a state is defined in which a multihop network is connected to a higher-level network ("a grounded state"), and a state is defined in which a multihop network is not connected to any higher-level network ("a floating state").

However, in the conventional technology, there is no disclosure of the details for controlling a multihop network by taking into account the abovementioned states. Thus, in the conventional technology, it is difficult to achieve reduction in the power consumption.

BRIEF DESCRIPTION OF THE DRAWINGS

FIG. 3 is a schematic diagram illustrating a data configuration of schedule information;
FIG. 6 is a schematic diagram illustrating a data configuration of schedule information.

DETAILED DESCRIPTION

Figure 1:
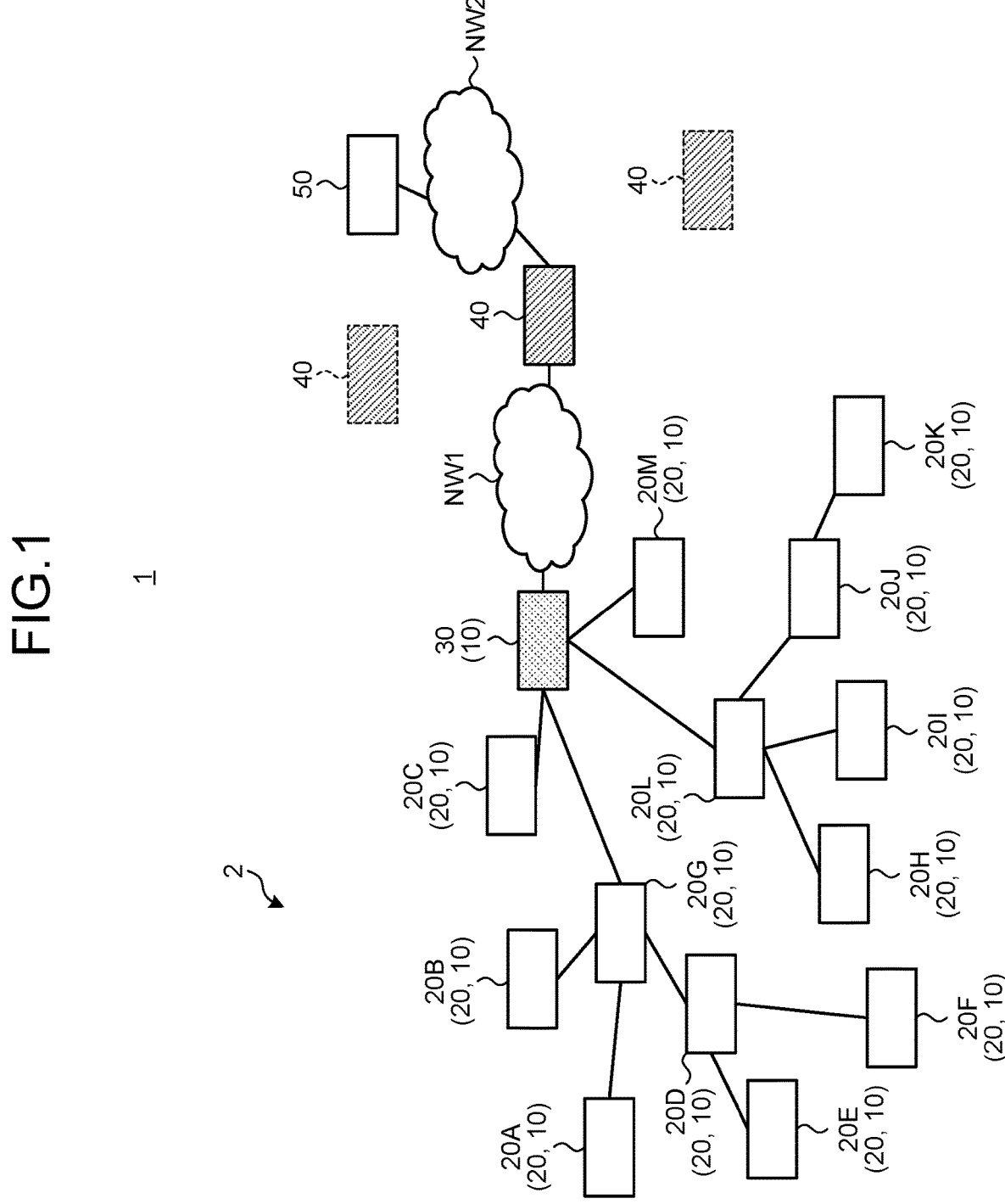
FIG. 1 is a schematic diagram illustrating a communication system.

A communication system according to one embodiment includes a plurality of first communication devices and a second communication device constituting a multihop network in collaboration with the first communication devices. The second communication device is capable of communicating with a server device via a lower-level network and via a gateway being mobile. The server device is connected to a higher-level network. The second communication device includes one or more hardware processors coupled to a memory. The one or more hardware processors are configured to manage schedule information containing communicable-period information indicating a communicable period during which the gateway is present within a communication range enabling communication with the second communication device via the lower-level network. The one or more hardware processors are configured to transmit first communication data addressed to the server device. The first communication data is transmitted to the server device via the lower-level network and the gateway in the communicable period indicated by the communicable-period information.

An exemplary embodiment of a communication system, a communication device, a communication method, and a computer program product will be explained below in detail with reference to the accompanying drawings.

In the following explanation of the embodiment, the portions referred to by the same reference numerals have practically identical functions, and the explanation regarding the identical portions is not repeatedly given.

First Embodiment

FIG. 1 is a schematic diagram illustrating an example of a communication system 1 according to an embodiment.

The communication system 1 includes a plurality of nodes 10, a gateway 40, and a server device 50.

The nodes 10 represent an example of communication devices. Herein, a plurality of nodes 10 constitutes a multihop network 2. In FIG. 1, fourteen (14) nodes 10 constitute the multihop network 2. The number of nodes 10 constituting the multihop network 2 is not limited to 14.

The nodes 10 constituting the multihop network 2 can be connected to each other in a wired manner or in a wireless manner. When the multihop network 2 is configured using a wired connection, for example, Ethernet (registered trademark) or serial communication is used as the communication method. When the multihop network 2 is configured using a wireless connection, for example, Wi-Fi (Wireless Fidelity), Bluetooth (registered trademark), or IEEE 802.15.4 is used as the communication method.

The communication system 1 includes first nodes 20 and a second node 30 as the nodes 10.

The first nodes 20 represent an example of first communication devices. The first nodes 20 are part of the nodes 10 that constitute the multihop network 2. The first nodes 20 are equipped with the function for communicating with the other first nodes 20 and with the second node 30, but are not equipped with the function for communicating with a lower-level network NW1. In FIG. 1, thirteen (13) first nodes 20 containing a first node 20A to a first node 20M constitute the multihop network 2. However, the number of first nodes 20 constituting the multihop network 2 is not limited to thirteen.

The second node 30 represents an example of a second communication device. Similar to the first nodes 20, the second node 30 is part of the nodes 10 constituting the multihop network 2. The second node 30 is equipped with the function for communicating with the first nodes 20. Moreover, the second node 30 is also capable of communicating with a gateway 40 via the lower-level network NW1. More specifically, the second node 30 is capable of communicating with the server device 50, which is connected to a higher-level network NW2, via the lower-level network NW1 and via the gateway 40 that is mobile.

The second node 30 can also function as, for example, the concentrator of the multihop network 2. In the present embodiment, the explanation is given about an example in which a single second node 30 is included in the multihop network 2. That is, in the present embodiment, the explanation is given about an example in which the entry-exit point between the multihop network 2 and the lower-level network NW1 is configured with a single second node 30.

The second node 30 is capable of establishing either a wired connection or a wireless connection with the lower-level network NW1. When the second node 30 establishes a wired connection with the lower-level network NW1, for example, Ethernet or serial communication is used as the communication method. On the other hand, when the second node 30 establishes a wireless connection with the lower-level network NW1, for example, Wi-Fi, Bluetooth, IEEE 802.15.4, a millimeter-wave-based communication method, a satellite communication method, or visible light communication is used.

The gateway 40 establishes a connection with the lower-level network NW1 and with the higher-level network NW2, and relays the communication among the server device 50, the second node 30, and the first nodes 20. Meanwhile, there is no restriction on the communication method implemented in the multihop network 2, the lower-level network NW1, and the higher-level network NW2.

According to the present embodiment, the gateway 40 is configured to be able to move through the real space. That enables the gateway 40 to intermittently establish a connection with the lower-level network NW1.

For example, the gateway 40 is installed in a mobile object that moves through the real space. Examples of the mobile object include a vehicle; a train; an elevator car that goes up and down in an elevator shaft; and a flying object such as an airplane or a drone.

Assume that the gateway 40 is installed in a vehicle. In that case, when the vehicle having the gateway 40 installed therein moves in the vicinity of the second node 30, the gateway 40 establishes a connection with the lower-level network NW1. Alternatively, assume that the gateway 40 is installed in a train. In that case, when the train having the gateway 40 installed therein stops at the station at which the second node 30 is installed, the gateway 40 establishes a connection with the lower-level network NW1. Still alternatively, assume that the gateway 40 is installed in an elevator car. In that case, when the elevator car having the gateway 40 installed therein stops at the floor on which the second node 30 is installed, the gateway 40 establishes a connection with the lower-level network NW1. Still alternatively, assume that the gateway 40 is installed in an airplane. In that case, when the airplane having the gateway 40 installed therein moves in the vicinity of the second node 30, the gateway 40 establishes a connection with the lower-level network NW1.

In this way, in the present embodiment, the gateway 40 is configured to be able to move through the real space. Hence, when a particular physical condition is satisfied, such as being present within the communication range enabling communication with the second node 30; the gateway 40 establishes a connection with the lower-level network NW1. That is, in the present embodiment, during the period of time in which the gateway 40 remains connected to the lower-level network NW1, the first nodes 20 and the second node 30 that constitute the multihop network 2 become able to communicate with the server device 50 via the gateway 40.

Given below is the explanation of an exemplary functional configuration of the second node 30 according to the present embodiment.

Figure 2:
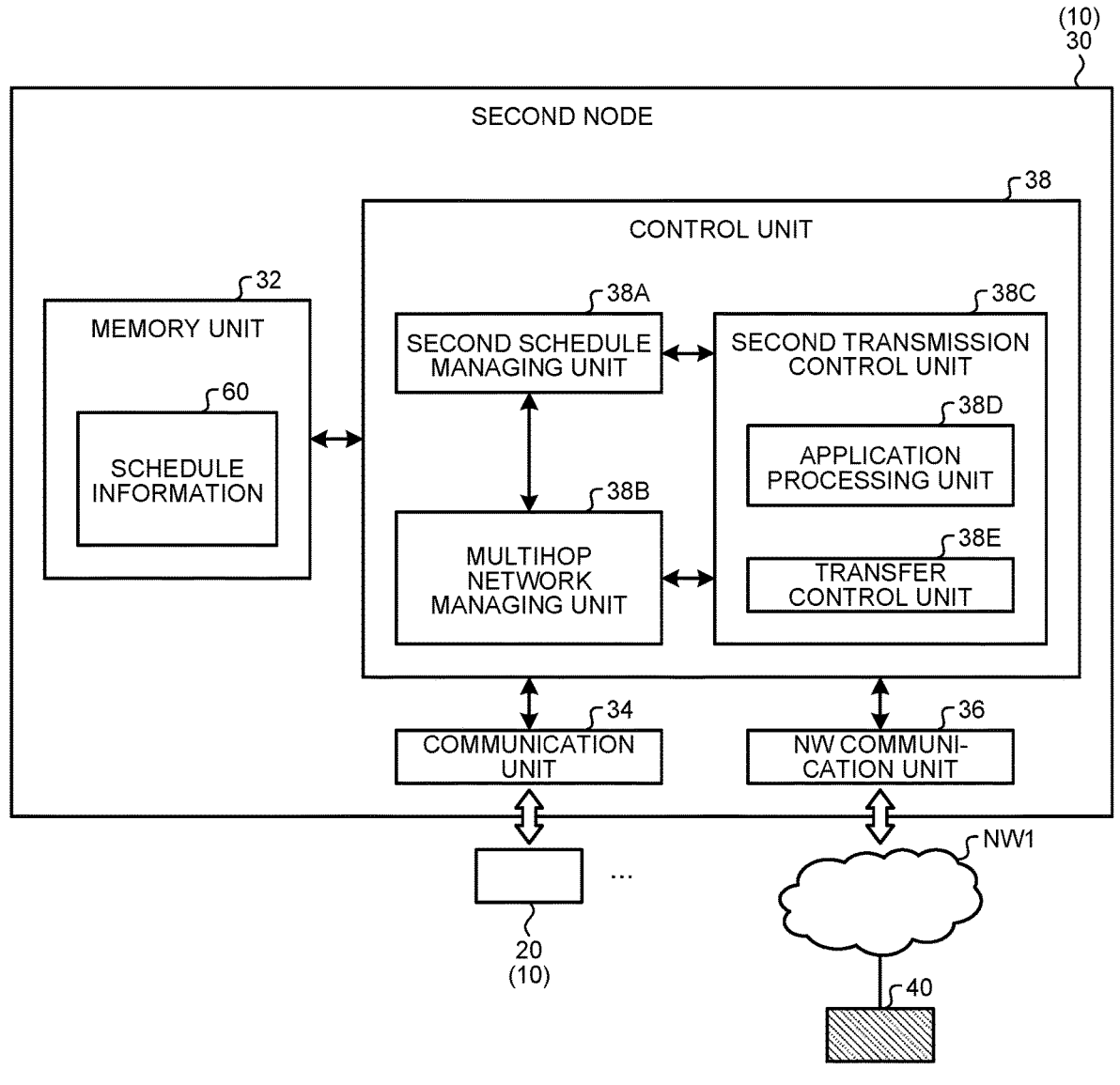
FIG. 2 is a schematic diagram illustrating a functional configuration of a second node.

FIG. 2 is a schematic diagram illustrating an exemplary functional configuration of the second node 30.

The second node 30 includes a memory unit 32, a control unit 38, a communication unit 34, and a network (NW) communication unit 36. The memory unit 32, the communication unit 34, the NW communication unit 36, and the control unit 38 are connected to each other in a manner of being able to transmit and receive data and signals.

The memory unit 32 is used to store a variety of data. In the present embodiment, the memory unit 32 is used to store schedule information 60. Regarding the schedule information 60, the detailed explanation is given later.

The communication unit 34 communicates with the first nodes 20 included in the multihop network 2. In the configuration of the multihop network 2 illustrated in FIG. 1, the communication unit 34 of the second node 30 performs direct communication with the first nodes 20C, 20G, 20L, and 20M, that is, performs communication in a single hop with the abovementioned nodes. With each remaining node 10, the communication unit 34 communicates via one or more nodes 10.

Returning to the explanation with reference to FIG. 2, the NW communication unit 36 establishes a connection with the lower-level network NW1 and communicates with the gateway 40.

The control unit 38 includes a second schedule managing unit 38A, a multihop network managing unit 38B, and a second transmission control unit 38C. Moreover, the second transmission control unit 38C includes an application processing unit 38D and a transfer control unit 38E.

The second schedule managing unit 38A, the multihop network managing unit 38B, the second transmission control unit 38C, the application processing unit 38D, and the transfer control unit 38E are implemented by using, for example, one or more processors. For example, the constituent elements of the control unit 38 can be implemented by causing a central processing unit (CPU) to execute computer programs, that is, can be implemented by using software. Alternatively, the constituent elements can be implemented by using a dedicated IC, that is, can be implemented by using hardware. Still alternatively, the constituent elements can be implemented by using a combination of software and hardware. In the case of using a plurality of processors, each processor either can implement one of the constituent elements or can implement two or more constituent elements.

The second schedule managing unit 38A manages the schedule information 60.

The schedule information 60 represents an example of schedule information.

The schedule information indicates the connection schedule of the gateway 40, which is included in the communication system 1, with respect to the lower-level network NW1. The schedule information is shared within the communication system 1. That is, the schedule information is shared among the server device 50, the gateway 40, and the nodes 10 included in the communication system 1.

The schedule information contains one or more sets of communicable-period information each of which indicates a communicable period. A communicable period represents a period of time during which the gateway 40 is present within the communication range enabling communication with the second node 30 via the lower-level network NW1. That is, a communicable period represents a period of time during which the gateway 40 establishes a connection with the lower-level network NW1. In other words, a communicable period represents a period of time during which the establishment of a connection by the gateway 40 with the lower-level network NW1 enables communication between the second node 30 and the gateway 40.

The communicable-period information either can indicate a particular timing or can indicate a period of time starting from a predetermined date and time to another date and time. In the present embodiment, the explanation is given about an example in which the communicable-period information indicates a period of time starting from a connection date/time at which the gateway 40 starts a connection with the lower-level network NW1 to a disconnection date/time at which the connection with the lower-level network NW1 gets disconnected.

FIG. 3 is a schematic diagram illustrating an exemplary data configuration of the schedule information 60. The schedule information 60 contains the communicable-period information. For example, a set of communicable-period information is expressed as a pair of a connection date/time and a disconnection date/time. That is, for example, a set of communicable-period information indicates the communicable period starting from a particular connection date/time to a particular disconnection date/time. In FIG. 3, an example is illustrated such that the schedule information 60 contains a plurality of sets of communicable-period information.

Meanwhile, as long as a communicable period is indicated, a set of communicable-period information is not limited to be expressed as a pair of a connection date/time and a disconnection date/time. For example, in the communicable-period information, pairs of a connection timing and a disconnection timing can be registered according to predetermined scheduling segments such as weekdays, non-working days, and public holidays, as in the case of a train timetable or a bus timetable. Alternatively, instead of including information about the year, the month, and the day; a set of communicable-period information can define a period of time expressed using timings.

Returning to the explanation with reference to FIG. 2, the second schedule managing unit 38A manages the schedule information 60 by storing it in the memory unit 32. In the present embodiment, the explanation is given about an example in which the second schedule managing unit 38A stores, in advance, the schedule information, which is distributed in advance from the server device 50 via the lower-level network NW1 and the gateway 40, as the schedule information 60 in the memory unit 32.

The multihop network managing unit 38B constitutes the multihop network 2 along with a plurality of first nodes 20 via the communication unit 34. In the configuration of the multihop network 2, it is possible to use various methods such as RPL (IPv6 Routing Protocol for Low power and Lossy Network), Bluetooth Mesh, and ZigBee (registered trademark).

The multihop network managing unit 38B incorporates the schedule information 60 as schedule information in a control message that is used for managing and maintaining the multihop network 2, and then transmits the control message to the first node 20. When RPL is used in the configuration of the multihop network 2, the multihop network managing unit 38B incorporates the schedule information in a control message named DIO (DODAG Information Object), and then transmits the control message to the first node 20. As a result of performing such transmission operation, the multihop network managing unit 38B distributes the schedule information, which is distributed from the server device 50, to the first nodes 20 included in the multihop network 2. As a result, the schedule information gets shared among the nodes 10 in the multihop network 2; the gateway 40; and the server device 50.

Meanwhile, in order to transmit the schedule information 60 to the first nodes 20, it is also possible to use a method not involving any control message. For example, as the means for transmitting the schedule information 60, the control header of an application message can be used, or a message dedicated for the transmission of the schedule information 60 can be used.

Meanwhile, the second schedule managing unit 38A can incorporate, as the schedule information in a control message, all sets of communicable-period information specified in the schedule information 60 that is stored in the memory unit 32. Alternatively, the second schedule managing unit 38A can incorporate, as the schedule information in a control message, only some of a plurality of sets of communicable-period information specified in the schedule information 60 that is stored in the memory unit 32. In the case of incorporating only some part of the schedule information 60 in a control message, from among a plurality of sets of communicable-period information included in the schedule information 60, a predetermined number of sets of communicable-period information can be extracted in order of timings starting from the closest timing to the present timing toward the future timings, and the extracted sets can be incorporated as the schedule information in the control message.

Given below is the explanation of the second transmission control unit 38C. The second transmission control unit 38C performs transmission control with respect to the first communication data and the second communication data. Meanwhile, the terms "transmission" and "transmission control" include the meaning of transmitting the data originating in the concerned node as well as include the meaning of transferring the data that was received from other nodes.

The first communication data represents an example of communication data that originates in any first node 20 or the second node 30 and that is communicated to the server device 50 representing the final destination. Hence, the first communication data contains the identification information of the server device 50 as the information indicating the final destination.

The second communication data represents an example of communication data that originates in the server device 50 or the gateway 40 and that is communicated to any first node 20 or the second node 30 representing the final destination.

Hence, the second communication data contains the identification information of any first node 20 or the second node 30 as the information indicating the final destination. Moreover, the second communication data for which any first node 20 represents the final destination contains the identification information of the second node 30 as the relay destination, as well as contains the identification information of the concerned first node 20 as the final destination.

According to the present embodiment, in the communicable period which is indicated by the communicable-period information specified in the schedule information, the second transmission control unit 38C performs transmission control to transmit the first communication data to the server device 50 via the lower-level network NW1 and the gateway 40.

According to the present embodiment, the second transmission control unit 38C includes an application processing unit 38D and a transfer control unit 38E.

The application processing unit 38D processes the application data that is received from any first node 20 and that is addressed to the corresponding node. Herein, the corresponding node implies the concerned node 10. The application processing unit 38D can also generate, as new first communication data for which the server device 50 represents the final destination, application data as received from any first node 20. Alternatively, the application processing unit 38D can voluntarily generate first communication data regardless of the reception of application data.

Moreover, when second communication data for which the corresponding node represents the final destination is received from the server device 50 via the gateway 40 and the lower-level network NW1, the application processing unit 38D processes the second communication data.

The transfer control unit 38E controls the transfer of the communication data between some first node 20 and the server device 50. Moreover, when the communication unit 34 receives the first communication data that represents the communication data for which the server device 50 is the final destination, the transfer control unit 38E transfers that first communication data to the server device 50 via the NW communication unit 36. When the NW communication unit 36 receives the second communication data for which a node other than the corresponding node is the final destination, the transfer control unit 38E transfers the second communication data to some first node 20 via the communication unit 34.

In the case of performing transmission control with respect to the first communication data for which the server device 50 represents the final destination, the second transmission control unit 38C that includes the application processing unit 38D and the transfer control unit 38E adjusts the transmission timing regarding the first communication data on the basis of the schedule information 60. More specifically, the second transmission control unit 38C reads the schedule information 60 from the memory unit 32. Then, in the communicable period which is indicated by the communicable-period information specified in the schedule information 60, the second transmission control unit 38C performs transmission control to transmit the first communication data to the server device 50 via the lower-level network NW1 and the gateway 40.

That is, during the period of time in which the gateway 40 is not connected to the lower-level network NW1, the second transmission control unit 38C remains on standby for transmitting the first communication data to the gateway 40. On the other hand, in the communicable period in which the gateway 40 remains connected to the lower-level network NW1, the second transmission control unit 38C performs transmission control to transmit the first communication data to the gateway 40.

The second transmission control unit 38C can transmit the first communication data to the gateway 40 when the present timing falls within the communicable period indicated by the communicable-period information. Alternatively, the second transmission control unit 38C can wait for a predetermined period of time since the arrival of the present timing within the communicable period indicated by the communicable-period information, and then transmit the first communication data to the gateway 40 within the same communicable period.

Moreover, in the connected state in which the gateway 40 is connected to the lower-level network NW1, the second transmission control unit 38C can periodically measure the communication delay occurring between the corresponding node and the gateway 40. Then, once the present timing reaches a timing within the period of time equivalent to the communication delay from a timing within the communicable period indicated by the communicable-period information, the second transmission control unit 38C can transmit the first communication data to the gateway 40.

Moreover, when the present timing reaches a timing within the communicable period indicated by the communicable-period information and when the connection between the gateway 40 and the lower-level network NW1 can be confirmed, the second transmission control unit 38C can transmit the first communication data to the gateway 40.

There is no restriction on the method for confirming the connection between the gateway 40 and the lower-level network NW1. For example, the second transmission control unit 38C can transmit a connection confirmation message to the gateway 40 and can determine the response to the control message, and thus can confirm the connection between the gateway 40 and the lower-level network NW1. More particularly, for example, the second transmission control unit 38C transmits an ICMP Echo Request message as the connection confirmation message to the gateway 40. Then, the second transmission control unit 38C confirms about the connection by determining whether or not an ICMP Echo Reply is received as the response from the gateway 40.

Alternatively, the second transmission control unit 38C can confirm the connection between the gateway 40 and the lower-level network NW1 by determining the notification about the connection state of the gateway 40 as received from the lower-level network NW1. Still alternatively, the second transmission control unit 38C can confirm the connection between the gateway 40 and the lower-level network NW1 by confirming the linked status representing the connection status of the NW communication unit 36.

Given below is the explanation of an exemplary functional configuration of the first node 20 according to the present embodiment.

Figure 4:
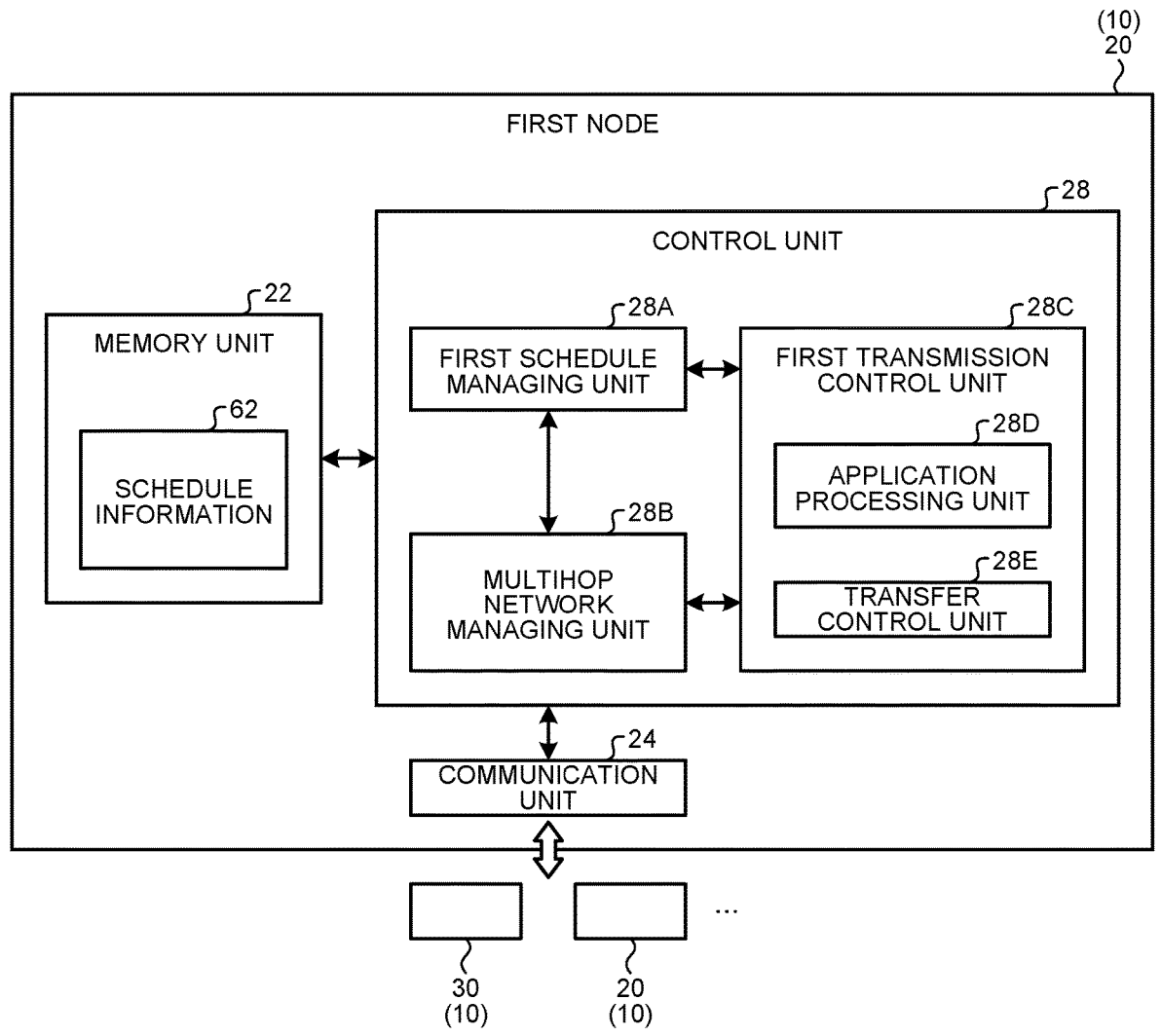
FIG. 4 is a schematic diagram illustrating a functional configuration of a first node.

FIG. 4 is a schematic diagram illustrating an exemplary functional configuration of the first node 20.

The first node 20 includes a memory unit 22, a control unit 28, and a communication unit 24. The memory unit 22, the communication unit 24, and the control unit 28 are connected to each other in a manner of being able to transmit and receive data and signals.

The memory unit 22 is used to store a variety of data. In the present embodiment, the memory unit 22 is used to store schedule information 62.

The communication unit 24 communicates with the nodes 10 included in the multihop network 2. That is, the communication unit 24 communicates with another first node 20 and the second node 30 either directly or via other first nodes 20.

The control unit 28 includes a first schedule managing unit 28A, a multihop network managing unit 28B, and a first transmission control unit 28C. Moreover, the first transmission control unit 28C includes an application processing unit 28D and a transfer control unit 28E. The first schedule managing unit 28A, the multihop network managing unit 28B, the first transmission control unit 28C, the application processing unit 28D, and the transfer control unit 28E are implemented by using, for example, one or more processors.

The first schedule managing unit 28A manages the schedule information 62. Herein, the first schedule managing unit 28A manages the schedule information 62 by storing it in the memory unit 22. For example, the first schedule managing unit 28A stores, as the schedule information 62 in the memory unit 22, schedule information distributed from the second node 30. More specifically, the first schedule managing unit 28A stores, as the schedule information 62 in the memory unit 22, the schedule information included in a control message received from the second node 30 either directly or via other first nodes 20. The data configuration of the schedule information 62 is similar to the data configuration of the schedule information 60 (see FIG. 3).

As explained earlier, the second schedule managing unit 38A of the second node 30 can incorporate, as the schedule information in a control message, only some of a plurality of sets of communicable-period information specified in the schedule information 60 that is stored in the memory unit 32 of the second node 30. In that case, the first schedule managing unit 28A of the first node 20 stores, as the schedule information 62 in the memory unit 22, the same sets of communicable-period information specified in the schedule information 60 that is managed by the second node 30; and manages the schedule information 62.

As a result of performing such operations, the first schedule managing unit 28A shares the schedule information with a plurality of nodes 10 included in the multihop network 2. That is, the server device 50, the gateway 40, and the nodes 10 included in the communication system 1 shares the schedule information containing the same communicable-period information.

The multihop network managing unit 28B constitutes the multihop network 2 along with a plurality of first nodes 20 and the second node 30 via the communication unit 24.

The first transmission control unit 28C performs transmission control with respect to the first communication data and the second communication data.

In the present embodiment, in the communicable period which is indicated by the communicable-period information specified in the schedule information 62, the first transmission control unit 28C performs transmission control to transmit the first communication data to the server device 50 via the second node 30, the lower-level network NW1, and the gateway 40.

In the present embodiment, the first transmission control unit 28C includes an application processing unit 28D and a transfer control unit 28E.

The application processing unit 28D processes the application data received from some other node 10 and addressed to the corresponding first node 20. The application processing unit 28D can also generate, as new first communication data for which the server device 50 represents the final destination, the application data as received from the other nodes 10. the application processing unit 38D can voluntarily generate first communication data regardless of the reception of application data.

Moreover, when second communication data for which the corresponding first node 20 represents the final destination is received from the server device 50 via the gateway 40, the lower-level network NW1, and the second node 30; the application processing unit 28D processes that second communication data.

The transfer control unit 28E controls the transfer of communication data to the other nodes 10. When the communication unit 24 receives the first communication data from some other node 10, the transfer control unit 38E transfers that first communication data to the second node 30. Moreover, when the communication unit 24 receives the second communication data for which some other first node 20 represents the final destination, the transfer control unit 28E transfers that second communication data to other first nodes 20 via the communication unit 24.

In the case of transmitting the first communication data for which the server device 50 represents the final destination, the first transmission control unit 28C that includes the application processing unit 28D and the transfer control unit 28E adjusts the transmission timing of the first communication data on the basis of the schedule information 62. More specifically, the application processing unit 28D reads the schedule information 62 from the memory unit 22. Then, in the communicable period which is indicated by the communicable-period information specified in the schedule information 62, the first transmission control unit 28C performs transmission control to transmit the first communication data to the server device 50 via the second node 30, the lower-level network NW1, and the gateway 40.

That is, during the period of time in which the gateway 40 is not connected to the lower-level network NW1, the first transmission control unit 28C remains on standby for transmitting the first communication data to the gateway 40 via the second node 30. On the other hand, in the communicable period in which the gateway 40 remains connected to the lower-level network NW1, the first transmission control unit 28C transmits the first communication data to the gateway 40 via the second node 30. Thus, it serves the purpose if the first transmission control unit 28C performs transmission control with respect to the first communication data for which the server device 50 represents the final destination and for which the second node 30 represents the relay destination.

The first transmission control unit 28C can transmit the first communication data to the second node 30 when the present timing falls within the communicable period indicated by the communicable-period information. Alternatively, the first transmission control unit 28C can wait for a predetermined period of time since the arrival of the present timing within the communicable period indicated by the communicable-period information, and then can transmit the first communication data to the second node 30 within the same communicable period.

Moreover, in the connected state in which the gateway 40 is connected to the lower-level network NW1, the first transmission control unit 28C can periodically measure the communication delay occurring between the corresponding first node 20 and the gateway 40. Then, once the present timing reaches a timing within the period of time equivalent to the communication delay from a timing within the communicable period indicated by the communicable-period information, the first transmission control unit 28C can transmit the first communication data to the second node 30.

Moreover, when the present timing reaches a timing within the communicable period indicated by the communicable-period information and when the connection between the gateway 40 and the lower-level network NW1 can be confirmed by the second node 30, the first transmission control unit 28C can transmit the first communication data to the second node 30.

Given below is the explanation of an exemplary functional configuration of the gateway 40 according to the present embodiment. As explained earlier, the gateway 40 is configured to be movable through the real space. The gateway 40 moves through the real space according to the schedule information shared within the communication system 1. For example, the control unit of the mobile object in which the gateway 40 is installed controls the driving unit of the mobile object so as to enable movement through the real space according to the schedule information.

Figure 5:
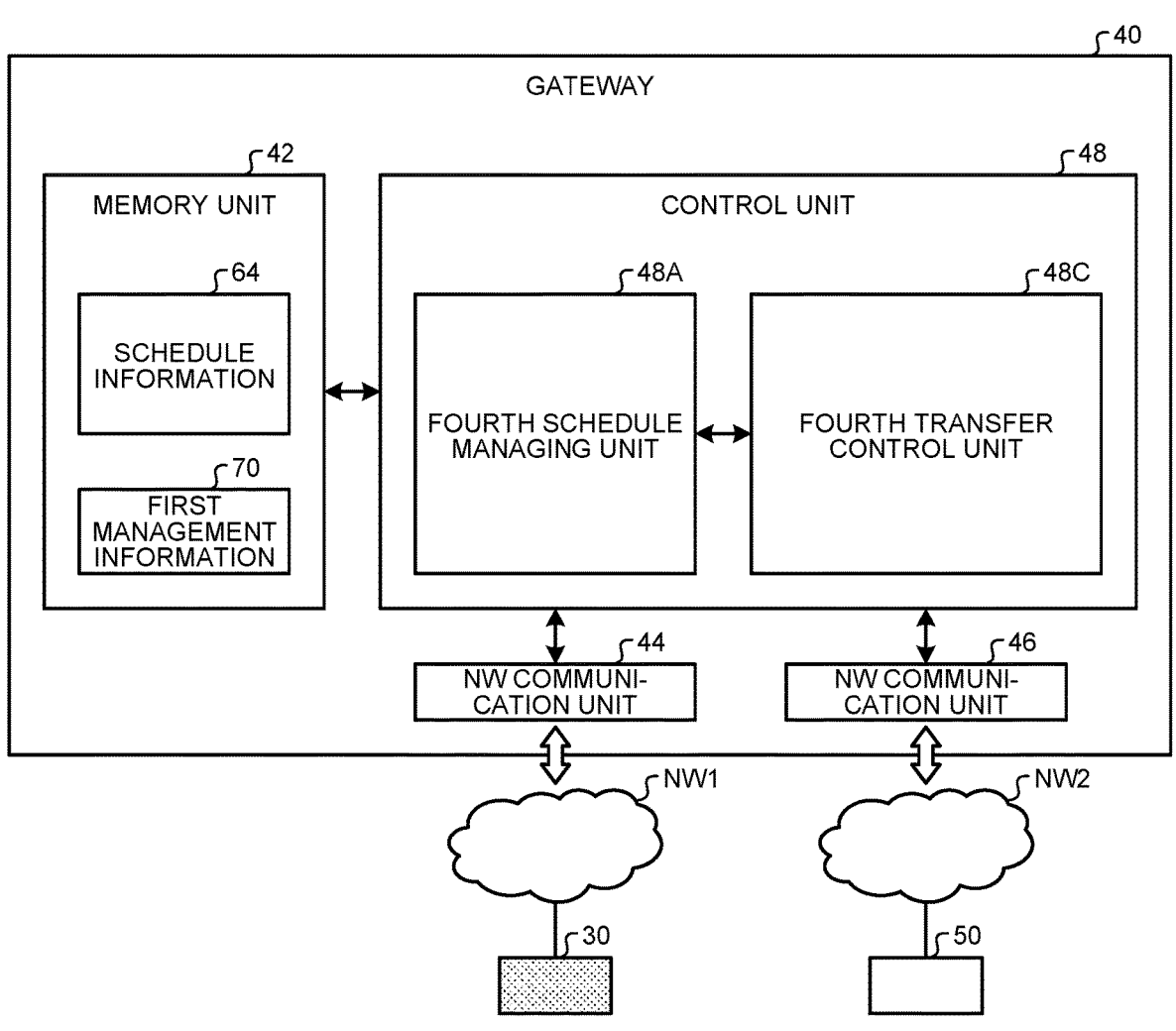
FIG. 5 is a schematic diagram illustrating a functional configuration of a gateway.

FIG. 5 is a schematic diagram illustrating an exemplary functional configuration of the gateway 40.

The gateway 40 includes a memory unit 42, a control unit 48, an NW communication unit 44, and an NW communication unit 46. The memory unit 42, the NW communication unit 44, the NW communication unit 46, and the control unit 48 are connected to each other in a manner of being able to transmit and receive data and signals.

The memory unit 42 is used to store a variety of data. In the present embodiment, the memory unit 42 is used to store schedule information 64 and first management information 70. Regarding the schedule information 64 and the first management information 70, the detailed explanation is given later.

The NW communication unit 44 is capable of establishing a connection with the lower-level network NW1, and communicates with the second node 30 that is connected to the lower-level network NW1. When a connection confirmation message is received from the second node 30, the NW communication unit 44 transmits, for example, an ICMP Echo Reply as the response signal to the second node 30. The NW communication unit 46 establishes a connection with the higher-level network NW2 and communicates with the server device 50 that is connected to the higher-level network NW2.

The control unit 48 includes a fourth schedule managing unit 48A and a fourth transfer control unit 48C. The fourth schedule managing unit 48A and the fourth transfer control unit 48C are implemented by using, for example, one or more processors.

The fourth schedule managing unit 48A manages the schedule information 64 by storing it in the memory unit 42. In the present embodiment, the explanation is given about an example in which the fourth schedule managing unit 48A stores, in advance and as the schedule information 64 in the memory unit 32, the schedule information that is distributed from the server device 50.

In the schedule information 64, lower-level NW identification information, which enables identification of the lower-level network NW1 to which the gateway 40 can establish a connection, is associated to the communicable-period information, which indicates the communicable period during which the gateway 40 is present within the communication range enabling communication with the second node 30 via the lower-level network NW1 identified by the lower-level NW identification information. The communicable-period information is similar to the explanation given earlier. That is, the fourth schedule managing unit 48A manages, as the schedule information 64, the information in which the lower-level NW identification information is further associated to one or more sets of communicable-period information specified in the schedule information 60 and the schedule information 62 explained earlier.

FIG. 6 is a schematic diagram illustrating an exemplary data configuration of the schedule information 64. In the schedule information 64, the communicable-period information is associated to the lower-level NW identification information. The communicable-period information is similar to the explanation given earlier. The lower-level NW identification information enables identification of the lower-level network NW1.

Returning to the explanation with reference to FIG. 5, the fourth schedule managing unit 48A stores, as the schedule information 64 in the memory unit 32, the schedule information distributed from the server device 50; and manages the schedule information 64. Moreover, when the gateway 40 establishes a connection with the lower-level network NW1, the fourth schedule managing unit 48A transmits the schedule information, which is received from the server device 50, to the second node 30 that is connected to the lower-level network NW1. More specifically, when the gateway 40 establishes a connection with the lower-level network NW1, the fourth schedule managing unit 48A transmits the group of sets of communicable-period information, which is associated to the lower-level NW identification of the lower-level network NW1 in the schedule information 64, as the schedule information to the second node 30 that is connected to the lower-level network NW1.

The fourth transfer control unit 48C controls the transfer of the communication data between the second node 30 and the server device 50. That is, the fourth transfer control unit 48C performs transfer control with respect to the first communication data and the second communication data.

When the NW communication unit 44 receives the first communication data from the second node 30, the fourth transfer control unit 48C transfers the first communication data to the server device 50 via the NW communication unit 46.

When the NW communication unit 46 receives the second communication data from the server device 50, the fourth transfer control unit 48C transfers the second communication data to the second node 30 via the lower-level network NW1.

In the case of performing transfer control with respect to the second communication data for which any first node 20 or the second node 30 represents the final destination, the fourth transfer control unit 48C adjusts the transfer timing of the second communication data on the basis of the schedule information 64. More specifically, the fourth transfer control unit 48C reads the schedule information 64 from the memory unit 42. Moreover, the fourth transfer control unit 48C identifies the lower-level NW identification information of the lower-level network NW1 to which is connected the second node 30 that is set as the final destination or the relay destination in the second communication data received from the server device 50.

The memory unit 42 of the gateway 40 is used to store the first management information 70 in which the following information is held in a corresponding manner: the lower-level NW identification information; the identification information of the second node 30 that is connected to the lower-level network NW1 identified by the lower-level NW identification information; and the identification information of the first nodes 20 included in the multihop network 2 that also includes the second node 30.

The fourth transfer control unit 48C identifies, from the first management information, the lower-level NW identification information corresponding to the identification information of the second node 30 that is set as the final destination or the relay destination in the second communication data received from the server device 50. Then, the fourth transfer control unit 48C reads, from the schedule information 64, the communicable-period information corresponding to the identified lower-level NW identification information.

In the communicable period indicated by the read communicable-period information, the fourth transfer control unit 48C performs transfer control to transfer the second communication data to the second node 30.

That is, during the period of time in which the gateway 40 is not connected to the lower-level network NW1, the fourth transfer control unit 48C remains on standby for transferring the second communication data to the second node 30 that is connected to the lower-level network NW1. Moreover, in the communicable period in which the gateway 40 establishes a connection with the lower-level network NW1, the fourth transfer control unit 48C performs transfer control to transfer the second communication data to the second node 30 that is connected to the lower-level network NW1.

The fourth transfer control unit 48C can transfer the second communication data to the second node 30 when the present timing falls within the communicable period indicated by the communicable-period information. Alternatively, the fourth transfer control unit 48C can wait for a predetermined period of time since the arrival of the present timing within the communicable period indicated by the communicable-period information, and then can transfer the second communication data to the second node 30 within the same communicable period.

Moreover, in the connected state in which the gateway 40 is connected to the lower-level network NW1, the fourth transfer control unit 48C can periodically measure the communication delay occurring between the gateway 40 and the second node 30. Then, once the present timing reaches a timing within the period of time equivalent to the communication delay from a timing within the communicable period indicated by the communicable-period information, the fourth transfer control unit 48C can transfer the second communication data to the second node 30.

Moreover, when the present timing reaches a timing within the communicable period indicated by the communicable-period information and when the connection between the gateway 40 and the lower-level network NW1 can be confirmed, the fourth transfer control unit 48C can transmit the second communication data to the second node 30. The method for confirming the connection between the gateway 40 and the lower-level network NW1 can be implemented in an identical manner to the method implemented by the second transmission control unit 38C.

Given below is the explanation of an exemplary functional configuration of the server device 50 according to the present embodiment.

Figure 7:
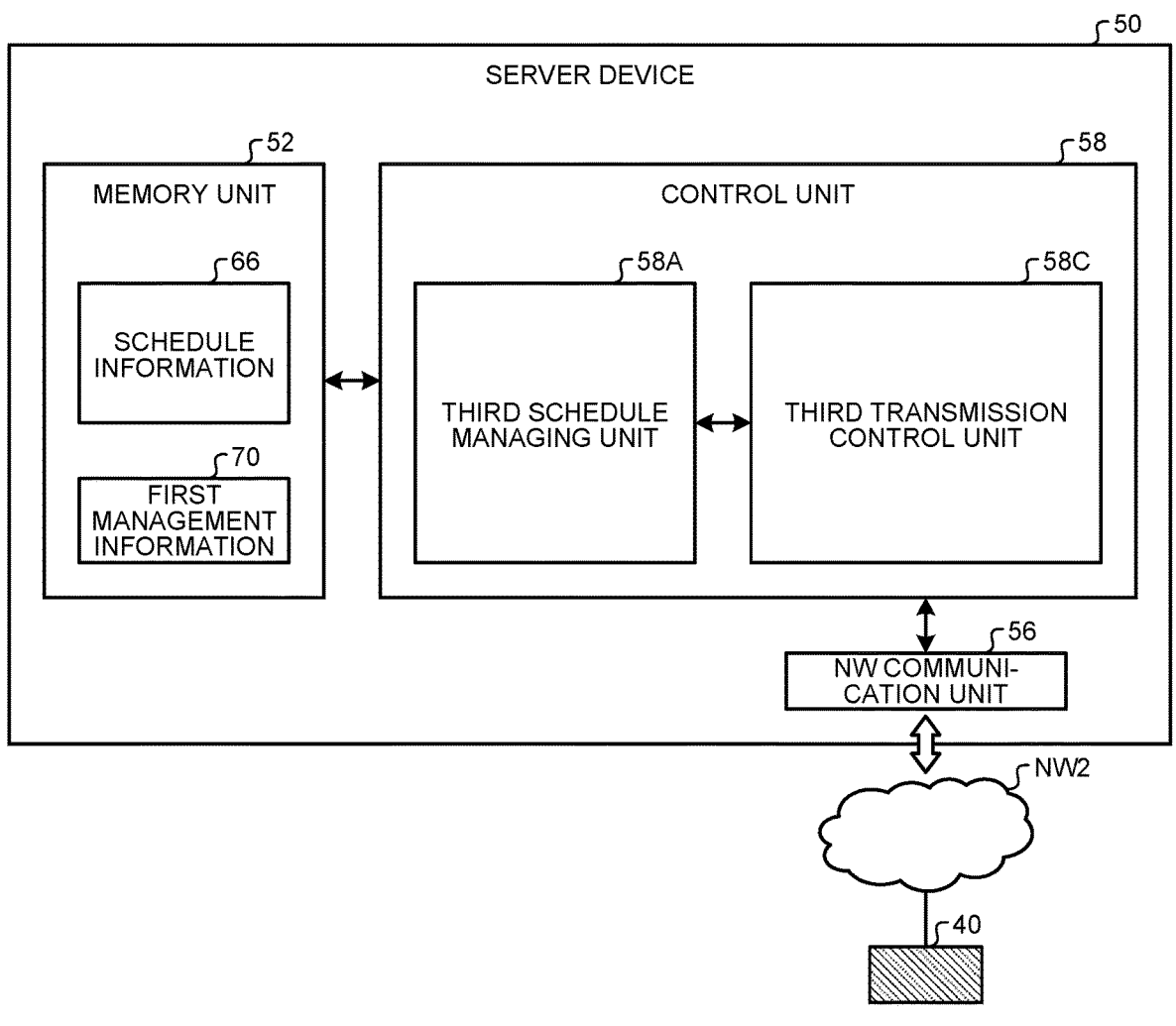
FIG. 7 is a schematic diagram illustrating a functional configuration of a server device.

FIG. 7 is a schematic diagram illustrating an exemplary functional configuration of the server device 50.

The server device 50 includes a memory unit 52, an NW communication unit 56, and a control unit 58. The memory unit 52, the NW communication unit 56, and the control unit 58 are connected to each other in a manner of being able to transmit and receive data and signals.

The memory unit 52 is used to store a variety of data. In the present embodiment, the memory unit 52 is used to store schedule information 66 and the first management information 70. Regarding the schedule information 66, the detailed explanation is given later. The first management information 70 has been explained earlier. Hence, that explanation is not given again.

The NW communication unit 56 establishes a connection with the higher-level network NW2. That is, the NW communication unit 56 communicates with the gateway 40 via the higher-level network NW2.

The control unit 58 includes a third schedule managing unit 58A and a third transmission control unit 58C. The third schedule managing unit 58A and the third transmission control unit 58C are implemented by using, for example, one or more processors.

The third schedule managing unit 58A manages the schedule information 66. The data configuration of the schedule information 66 is similar to the data configuration of the schedule information 64 (see FIG. 6).

For example, the third schedule managing unit 58A manages the schedule information 66 by storing it in the memory unit 52.

In the present embodiment, the third schedule managing unit 58A of the server device 50 generates schedule information and distributes it to the gateway 40, the second node 30, and the first nodes 20 included in the communication system 1.

For example, via a web API (API stands for Application Programming Interface) or a user interface, the third schedule managing unit 58A obtains information indicating the lower-level network NW1 with which the gateway 40 establishes a connection and indicating the communicable-period in which the gateway 40 establishes a connection. Then, based on the obtained information, the third schedule managing unit 58A generates schedule information in which the communicable-period information, which indicates the communicable period, is associated to the lower-level NW identification information of the lower-level network NW1 with which the gateway 40 establishes a connection in the communicable period indicated by the communicable-period information.

The third schedule managing unit 58A stores the generated schedule information as the schedule information 66 in the memory unit 52. Moreover, during the period of time in which the gateway 40 is connected to the lower-level network NW1, the third schedule managing unit 58A distributes the generated schedule information 66 to: the gateway 40; the second node 30 that is connected to the lower-level network NW1; and the first nodes 20 that constitute the multihop network 2 in collaboration with the second node 30.

As a result of the distribution operation performed by the third schedule managing unit 58A of the server device 50, the schedule information containing the same communicable-period information gets shared among the server device 50, the gateway 40, the second nodes 30, and the first nodes 20 included in the communication system 1.

Herein, neither there is any restriction on the distribution timing at which the control unit 58 distributes the schedule information, nor there is any restriction on the unit of the communicable-period information included in the schedule information to be distributed. For example, the third schedule managing unit 58A distributes the schedule information on a periodic basis. Moreover, when new schedule information is generated or when there are changes in the schedule information, the third schedule managing unit 58A can distribute the newly-generated schedule information or the changed schedule information.

The third transmission control unit 58C controls the transmission and the reception of the communication data.

The third transmission control unit 58C processes the first communication data received from the gateway 40.

In the case of performing transmission control with respect to the second communication data for which some first node 20 or the second node 30 represents the final destination, the third transmission control unit 58C adjusts the transmission timing of the second communication data on the basis of the schedule information 66. More specifically, the third transmission control unit 58C reads the schedule information 66 from the memory unit 52. Moreover, the third transmission control unit 58C identifies the lower-level NW identification information of the lower-level network NW1 to which is connected the second node 30 representing the final destination or the relay destination of the second communication data.

The memory unit 52 of the server device 50 is used to store, in advance, the first management information 70 in which the following information is held in a corresponding manner: the lower-level NW identification information; the identification information of the second node 30 that is connected to the lower-level network NW1 identified by the lower-level NW identification information; and the identification information of the first nodes 20 included in the multihop network 2 that also includes the second node 30.

The third transmission control unit 58C identifies, from the first management information 70, the lower-level NW identification information corresponding to the identification information of the second node 30 representing the final destination or the relay destination of the second communication data. Then, the third transmission control unit 58C reads, from the schedule information 66, the communicable-period information corresponding to the identified lower-level NW identification information.

In the communicable period indicated by the communicable-period information that is read, the third transmission control unit 58C performs transmission control to transmit the second communication data to the second node 30 via the gateway 40 and the lower-level network NW1.

That is, during the period of time in which the gateway 40 is not connected to the lower-level network NW1, the third transmission control unit 58C remains on standby for transmitting the second communication data to the second node 30 that is connected to the lower-level network NW1. On the other hand, in the communicable period in which the gateway 40 remains connected to the lower-level network NW1, the third transmission control unit 58C performs transmission control to transmit the second communication data to the second node 30 that is connected to the lower-level network NW1.

The third transmission control unit 58C can transmit the second communication data to the second node 30 when the present timing falls within the communicable period indicated by the communicable-period information. Alternatively, the third transmission control unit 58C can wait for a predetermined period of time since the arrival of the present timing within the communicable period indicated by the communicable-period information, and then transmit the second communication data to the second node 30 within the same communicable period.

Moreover, in the connected state in which the gateway 40 is connected to the lower-level network NW1, the third transmission control unit 58C can periodically measure the communication delay occurring between the server device 50 and the second node 30. Then, once the present timing reaches a timing within the period of time equivalent to the communication delay from a timing within the communicable period indicated by the communicable-period information, the third transmission control unit 58C can transmit the second communication data to the second node 30.

Moreover, when the present timing reaches a timing within the communicable period indicated by the communicable-period information and when the connection between the gateway 40 and the lower-level network NW1 can be confirmed, the third transmission control unit 58C can transmit the second communication data to the second node 30. The method for confirming the connection between the gateway 40 and the lower-level network NW1 can be implemented in an identical manner to the method implemented by the second transmission control unit 38C.

Given below is the explanation of an exemplary flow of the information processing performed in the communication system 1 according to the present embodiment.

Figure 8:
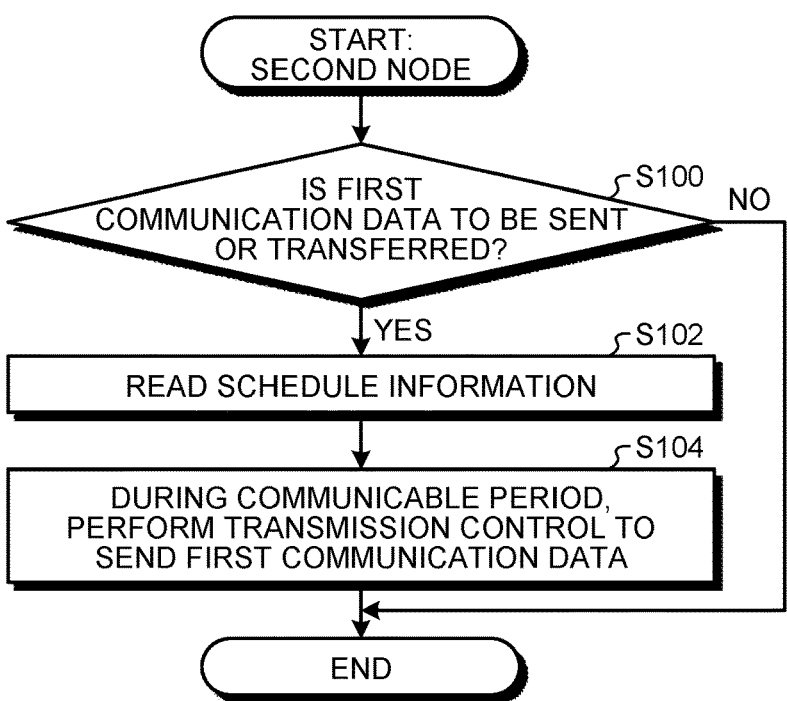
FIG. 8 is a flowchart for explaining a flow of the information processing performed by the second node.

FIG. 8 is a flowchart for explaining an exemplary flow of the information processing performed by the second node 30.

The second transmission control unit 38C of the second node 30 determines whether or not to transmit or transfer first communication data for which the server device 50 represents the final destination (Step S100). The second transmission control unit 38C performs the determination at Step S100 by determining whether or not the application processing unit 38D has generated first communication data for which the server device 50 represents the final destination. Moreover, as far as the determination about whether or not to transfer first communication data is concerned, the second transmission control unit 38C determines whether or not the communication data received from some first node 20 is first communication data for which the server device 50 represents the final destination.

If the determination at Step S100 is negative (No at Step S100), then the present routine is ended. On the other hand, if the determination at Step S100 is affirmative (Yes at Step S100), then the system control proceeds to Step S102.

At Step S102, the second transmission control unit 38C reads the schedule information 60 from the memory unit 32 (Step S102). Then, in the communicable period which is indicated by the communicable-period information specified in the schedule information 60, the second transmission control unit 38C performs transmission control to transmit the first communication data, about which the determination is done at Step S100, to the server device 50 via the lower-level network NW1 and the gateway 40 (Step S104). That marks the end of the present routine.

Figure 9:
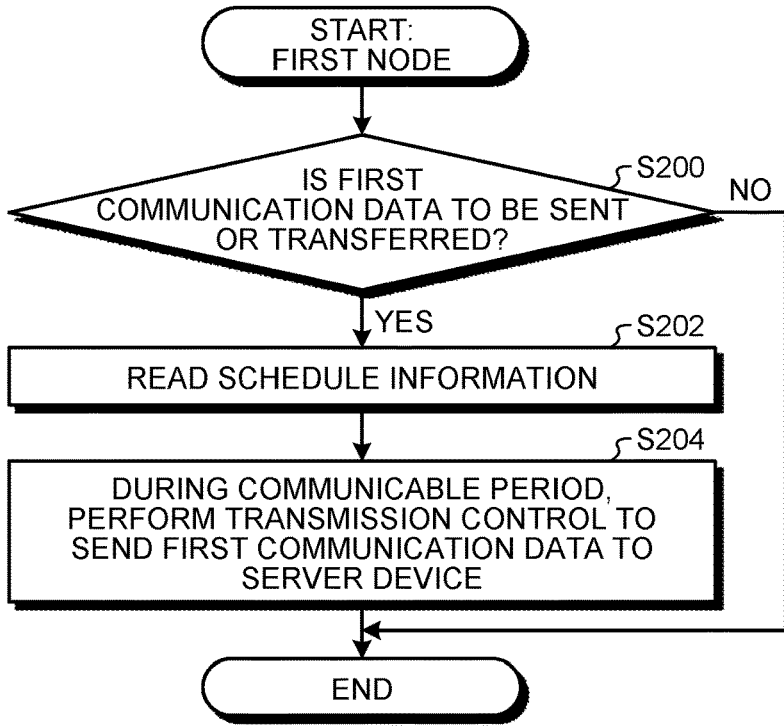
FIG. 9 is a flowchart for explaining a flow of the information processing performed by the first node.

FIG. 9 is a flowchart for explaining an exemplary flow of the information processing performed by the first node 20.

The first transmission control unit 28C of the first node 20 determines whether or not to transmit or transfer first communication data for which the server device 50 represents the final destination (Step S200). The first transmission control unit 28C performs the determination at Step S200 by determining whether or not the application processing unit 28D has generated first communication data for which the server device 50 represents the final destination. Moreover, as far as the determination about whether or not to transfer first communication data is concerned, the first transmission control unit 28C determines whether or not the communication data received from some other first node 20 is first communication data for which the server device 50 represents the final destination.

If the determination at Step S200 is negative (No at Step S200), then the present routine is ended. On the other hand, if the determination at Step S200 is affirmative (Yes at Step S200), then the system control proceeds to Step S202.

At Step S202, the first transmission control unit 28C reads the schedule information 62 from the memory unit 22 (Step S202). Then, in the communicable period which is indicated by the communicable-period information specified in the schedule information 62, the first transmission control unit 28C performs transmission control to transmit the first communication data, about which the determination is done at Step S200, to the server device 50 via the second node 30, the lower-level network NW1, and the gateway 40 (Step S204). That marks the end of the present routine.

Figure 10:
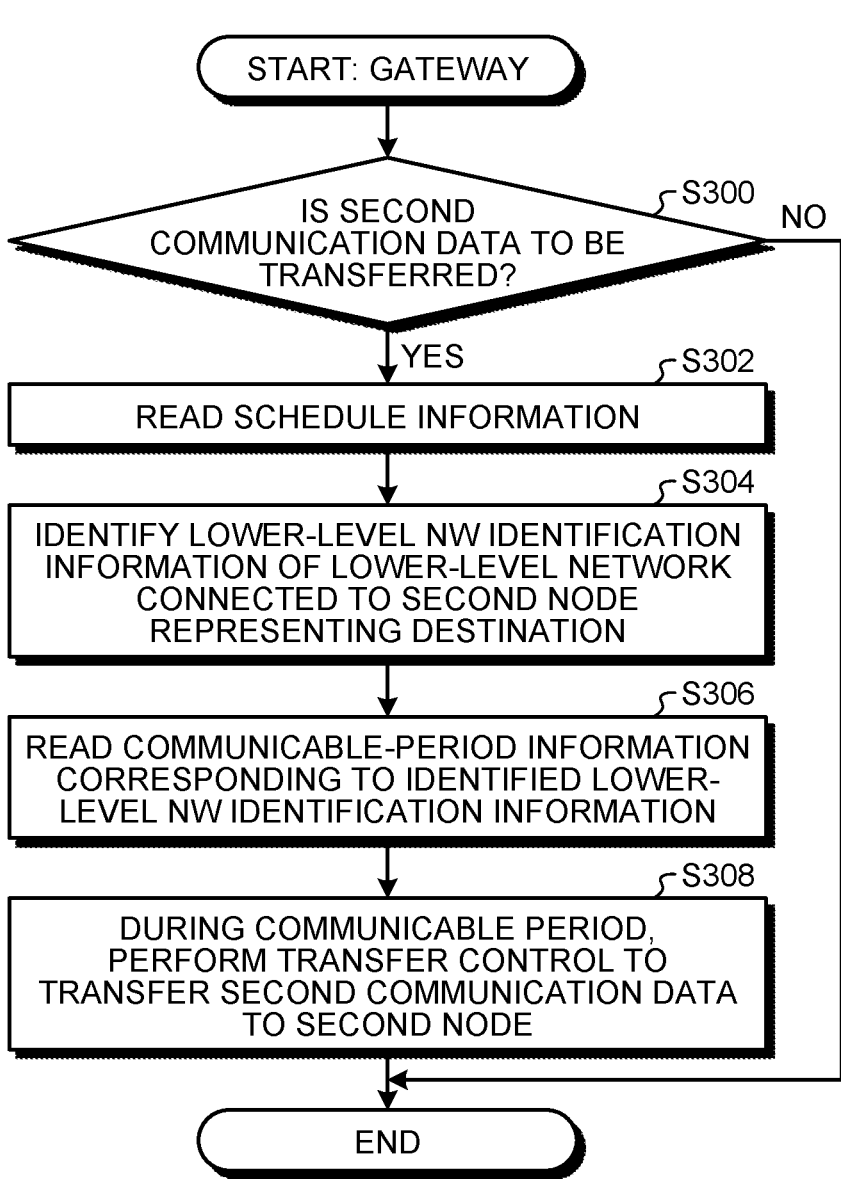
FIG. 10 is a flowchart for explaining a flow of the information processing performed by the gateway.

FIG. 10 is a flowchart for explaining an exemplary flow of the information processing performed by the gateway 40.

The fourth transfer control unit 48C of the gateway 40 determines whether or not to transfer second communication data for which some first node 20 or the second node 30 represents the final destination (Step S300). The fourth transfer control unit 48C performs the determination at Step S300 by determining whether or not second communication data is received from the server device 50.

If the determination at Step S300 is negative (No at Step S300), then the present routine is ended. On the other hand, if the determination at Step S300 is affirmative (Yes at Step S300), then the system control proceeds to Step S302.

At Step S302, the fourth transfer control unit 48C reads the schedule information 64 from the memory unit 42 (Step S302).

Then, the fourth transfer control unit 48C identifies, from the first management information 70, the lower-level NW identification information of the lower-level network NW1 to which is connected the second node 30 that is set as the final destination or the relay destination in the second communication data, about which the determination is performed at Step S300 (Step S304).

The fourth transfer control unit 48C reads, from the schedule information 64 read at Step S302, the communicable-period information corresponding to the lower-level NW identification information identified at Step S304 (Step S306).

Subsequently, in the communicable period indicated by the communicable-period information read at Step S306, the fourth transfer control unit 48C performs transfer control to transfer the second communication data to the second node 30, which was used in the identification at Step S304, via the lower-level network NW1 (Step S308). That marks the end of the present routine.

Figure 11:
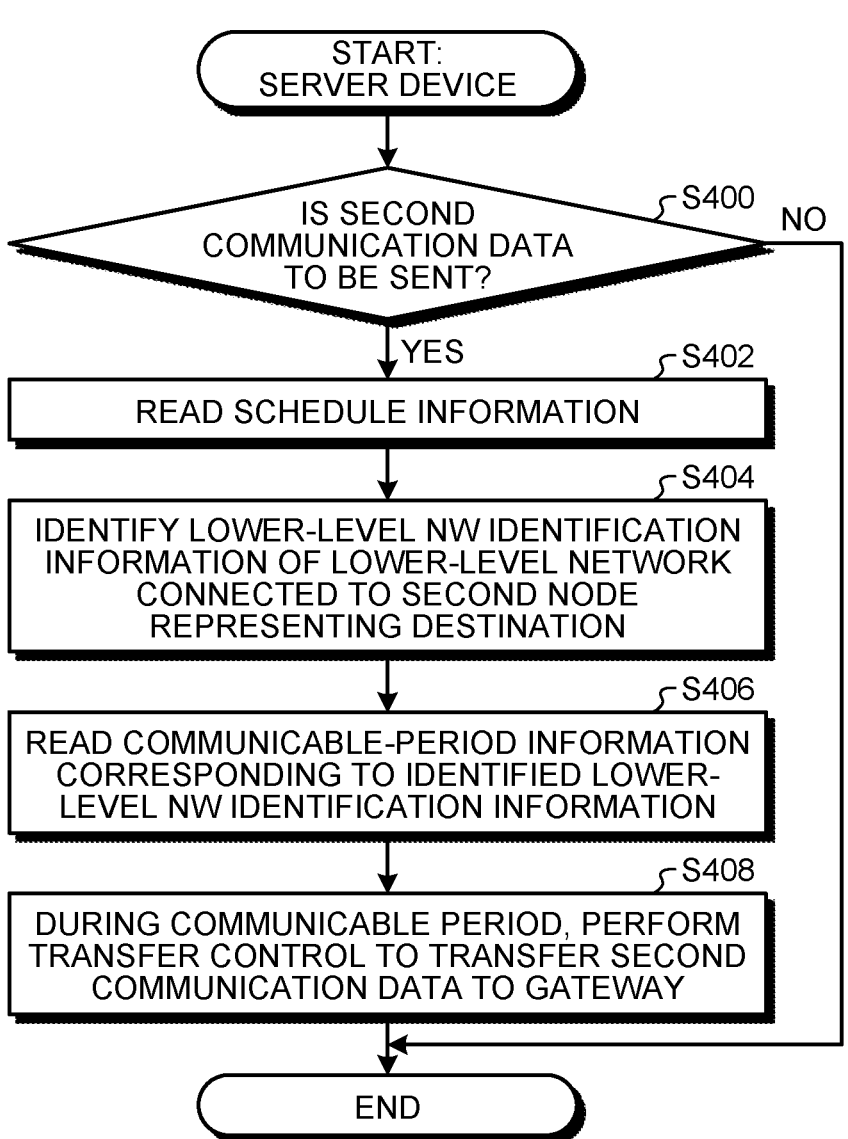
FIG. 11 is a flowchart for explaining a flow of the information processing performed by the server device.

FIG. 11 is a flowchart for explaining an exemplary flow of the information processing performed by the server device 50.

The third transmission control unit 58C of the server device 50 determines whether or not to transmit second communication data for which some first node 20 or the second node 30 represents the final destination (Step S400). The fourth transfer control unit 48C performs the determination at Step S400 by determining whether or not second communication data has been generated or by determining the presence or absence of the target second communication data for transmission.

If the determination at Step S400 is negative (No at Step S400), then the present routine is ended. On the other hand, if the determination at Step S400 is affirmative (Yes at Step S400), then the system control proceeds to Step S402.

At Step S402, the third transmission control unit 58C reads the schedule information 66 from the memory unit 52 (Step S402).

Then, the third transmission control unit 58C identifies, from the first management information 70, the lower-level NW identification information of the lower-level network NW1 to which is connected the second node 30 that is set as the final destination or the relay destination in the second communication data, about which the determination is performed at Step S400 (Step S404).

The third transmission control unit 58C reads, from the schedule information 66 read at Step S402, the communicable-period information corresponding to the lower-level NW identification information identified at Step S404 (Step S406).

Then, in the communicable period indicated by the communicable-period information read at Step S406, the third transmission control unit 58C performs transfer control to transfer the second communication data to the second node 30, which was used in the identification at Step S404, via the gateway 40 and the lower-level network NW1 (Step S408). That marks the end of the present routine.

As explained above, the communication system 1 according to the present embodiment includes the first nodes 20 (first communication devices) and the second node 30 (a second communication device). The first nodes 20 constitute the multihop network 2. The second node 30 constitutes the multihop network 2 in collaboration with the first nodes 20. The second node 30 is capable of communicating with the server device 50, which is connected to the higher-level network NW2, via the lower-level network NW1 and via the mobile gateway 40.

The second node 30 includes the second schedule managing unit 38A and the second transmission control unit 38C. The second schedule managing unit 38A manages the schedule information 60. The schedule information 60 contains the communicable-period information indicating the communicable period during which the gateway 40 is present in the communication range enabling communication with the second node 30 via the lower-level network NW1. In the communicable period indicated by the communicable-period information, the second transmission control unit 38C transmits the first communication data, which is addressed to the server device 50, to the server device 50 via the lower-level network NW1 and the gateway 40.

In this way, in the present embodiment, in the communicable period in which the mobile gateway 40 is present within the communication range enabling communication with the second node 30 via the lower-level network N1, the second transmission control unit 38C of the second node 30 transmits the first communication data to the server device 50 via the lower-level network NW1 and the gateway 40.

That is, in the communication system 1 according to the present embodiment, during the period of time in which the gateway 40 is not connected to the lower-level network NW1, there is no transmission of the first communication data from the second node 30 to the gateway 40. Thus, in the communication system 1 according to the present embodiment, during the period of time in which the gateway 40 remains connected to the lower-level network NW1, the first communication data is transmitted from the second node 30 to the gateway 40.

For that reason, in the communication system 1 according to the present embodiment, during the period of time in which the gateway 40 is not connected to the lower-level network NW1, it becomes possible to hold down the transmission of the first communication data from the second node 30 to the lower-level network NW1, thereby enabling holding down unnecessary power consumption.

Thus, the communication system 1 according to the present embodiment enables holding down the power consumption.

Moreover, in the communication system 1 according to the present embodiment, during the period of time in which the gateway 40 is not connected to the lower-level network NW1, since it becomes possible to hold down the transmission of the first communication data to the lower-level network NW1; in addition to achieving the effects explained above, it also becomes possible to hold down unnecessary retransmission of the communication data, to hold down the power consumption attributed to unnecessary retransmission of the communication data, and to hold down the data loss.

Moreover, in the communication system 1 according to the present embodiment, since it becomes possible to hold down unnecessary retransmission of the communication data, it also becomes possible to enhance the data reliability and to shorten the transfer period.

Moreover, in the communication system 1 according to the present embodiment, in the communicable period which is indicated by the communicable-period information specified in the schedule information 62, the first transmission control unit 28C of the first node 20 transmits the first communication data to the server device 50 via the second node 30, the lower-level network NW1, and the gateway 40.

For that reason, in the communication system 1 according to the present embodiment, during the period of time in which the gateway 40 is not connected to the lower-level network NW1, it becomes possible to hold down the transmission of the first communication from each of a plurality of first nodes 20 included in the multihop network 2 to the lower-level network NW1 via the second node 30.

Hence, in the communication system 1 according to the present embodiment, it becomes possible to further hold down unnecessary power consumption. Moreover, in the communication system 1 according to the present embodiment, it becomes possible to hold down congestion in the multihop network 2 attributed to unnecessary communication. Moreover, in the communication system 1 according to the present embodiment, it becomes possible to shorten the transfer period.

Moreover, in the communication system 1 according to the present embodiment, in the communicable period indicated by the communicable-period information corresponding to the lower-level NW identification of the lower-level network NW1 connected to the second node 30 that represents the destination, the fourth transfer control unit 48C of the gateway 40 transfers the second communication data to the second node 30 via the lower-level network NW1.

In this way, in the present embodiment, in the communicable period in which the gateway 40 is present within the communication range enabling communication with the second node 30 via the lower-level network NW1, the fourth transfer control unit 48C of the gateway 40 performs transfer control to transfer the second communication data to the second node 30 via the lower-level network NW1.

That is, in the communication system 1 according to the present embodiment, during the period of time in which the gateway 40 is not connected to the network NW1, there is no transfer of the second communication data from the gateway 40 to the second node 30. On the other hand, in the communication system 1 according to the present embodiment, during the period of time in which the gateway 40 remains connected to the network NW1, the second communication data is transferred from the gateway 40 to the second node 30.

Hence, in the communication system 1 according to the present embodiment, during the period of time in which the gateway 40 is not connected to the lower-level network NW1, it becomes possible to hold down the transmission of the second communication data from the gateway 40 to the lower-level network NW1, thereby enabling holding down unnecessary power consumption.

Hence, in the communication system 1 according to the present embodiment, it becomes possible to further hold down the power consumption.

In the communication system 1 according to the present embodiment, in the communicable period which is indicated by the communicable-period information specified in the schedule information 66 corresponding to the lower-level NW identification information of the lower-level network NW1 connected to the second node 30 representing the destination, the third transmission control unit 58C of the server device 50 transmits the second communication data to the second node 30 via the gateway 40 and the lower-level network NW1.

In this way, in the present embodiment, in the communicable period in which the gateway 40 is present within the communication range enabling communication with the second node 30 via the lower-level network NW1, the third transmission control unit 58C of the server device 50 transmits the second communication data to the second node 30 via the gateway 40 and the lower-level network NW1.

That is, in the communication system 1 according to the present embodiment, during the period of time in which the gateway 40 is not connected to the lower-level network NW1, there is no transmission of the second communication data from the server device 50 to the gateway 40. Moreover, in the communication system 1 according to the present embodiment, during the period of time in which the gateway 40 remains connected to the lower-level network NW1, the second communication data is transmitted from the server device 50 to the gateway 40.

Hence, in the communication system 1 according to the present embodiment, during the period of time in which the gateway 40 is not connected to the lower-level network NW1, it becomes possible to hold down the transmission of the second transmission data from the server device 50 to the lower-level network NW1 via the gateway 40, thereby enabling holding down unnecessary power consumption. As a result, in the communication system 1 according to the present embodiment, it becomes possible to further hold down the power consumption.

First Modification Example

In the embodiment described above, the explanation is given about an example in which each first node 20 as well as the second node 30 included in the communication system 1 adjusts the transmission timing of the first communication data on the basis of the corresponding schedule information (the schedule information 60 or the schedule information 62). That is, in the embodiment described above, the explanation is given for an example in which, in the communicable period which is indicated by the communicable-period information specified in the schedule information, each first node 20 as well as the second node 30 performs transmission control to transmit the first communication data to the server device 50 via the lower-level network NW1 and the gateway 40. However, alternatively, in the communication system 1, as long as at least either the concerned first node 20 or the second node 30 adjusts the transmission timing of the first communication data on the basis of the corresponding schedule information (the schedule information 60 or the schedule information 62), it serves the purpose.

Moreover, in the embodiment described above, the explanation is given about an example in which the gateway 40 as well as the server device 50 included in the communication system 1 adjusts the transmission timing of the second communication data on the basis of the corresponding schedule information (the schedule information 64 or the schedule information 66). That is, in the embodiment described above, the explanation is given about an example in which, in the communicable period which is indicated by the communicable-period information specified in the schedule information, the gateway 40 as well as the server device 50 transmits the second communication data to the concerned node 10 via the gateway 40 and the lower-level network NW1. However, alternatively, in the communication system 1, as long as at least either the gateway 40 or the server device 50 adjusts the transmission timing of the second communication data on the basis of the corresponding schedule information (the schedule information 64 or the schedule information 66), it serves the purpose.

Second Modification Example

In the embodiment described above, the explanation is given about an example in which the third schedule managing unit 58A of the server device 50 generates schedule information and distributes it to the gateway 40, the second node 30, and the first nodes 20 included in the communication system 1.

However, the schedule information is not limited to be generated and distributed by the server device 50. Alternatively, for example, the fourth schedule managing unit 48A of the gateway 40 can generate schedule information and distribute it to the server device 50, the second node 30, and the first nodes 20.

The following explanation is given with reference to FIG. 5. In this case, for example, via a web API or a user interface, the fourth schedule managing unit 48A of the gateway 40 obtains information indicating the communicable period and the lower-level network NW1 for the purpose of establishing a connection. Then, the fourth schedule managing unit 48A generates schedule information in which the communicable-period information indicating the communicable period is associated to the lower-level NW identification information of the lower-level network NW1 to which the gateway 40 would establish a connection in the communicable period indicated by the communicable-period information.

The fourth schedule managing unit 48A stores the generated schedule information as the schedule information 64 in the memory unit 42. Moreover, during the period of time in which the gateway 40 remains connected to the lower-level network NW1, the fourth schedule managing unit 48A distributes the generated schedule information to the second node 30 that is connected to the lower-level network NW1, and to the first nodes 20 that constitute the multihop network 2 along with the second node 30. Moreover, the fourth schedule managing unit 48A distributes the generated schedule information to the server device 50.

Similar to the embodiment described above, the second mode 30 and the first nodes 20 that have the schedule information distributed thereto can manage the schedule information by storing it as the schedule information 60 and the schedule information 62, respectively.

The third schedule managing unit 58A of the server device 50, to which the schedule information is distributed, can manage the schedule information by storing it as the schedule information 66 in the memory unit 52.

Third Modification Example

In the embodiment described earlier, the explanation has been given about an example in which the multihop network 2 includes a single second node 30. That is, in the embodiment described earlier, the explanation has been given about an example in which the entry-exit point between the multihop network 2 and the lower-level network NW1 is configured with a single second node 30.

However, alternatively, the multihop network 2 can include a plurality of second nodes 30. That is, there can be a plurality of entry-exit points between the multihop network 2 and the lower-level network NW1.

Figure 12:
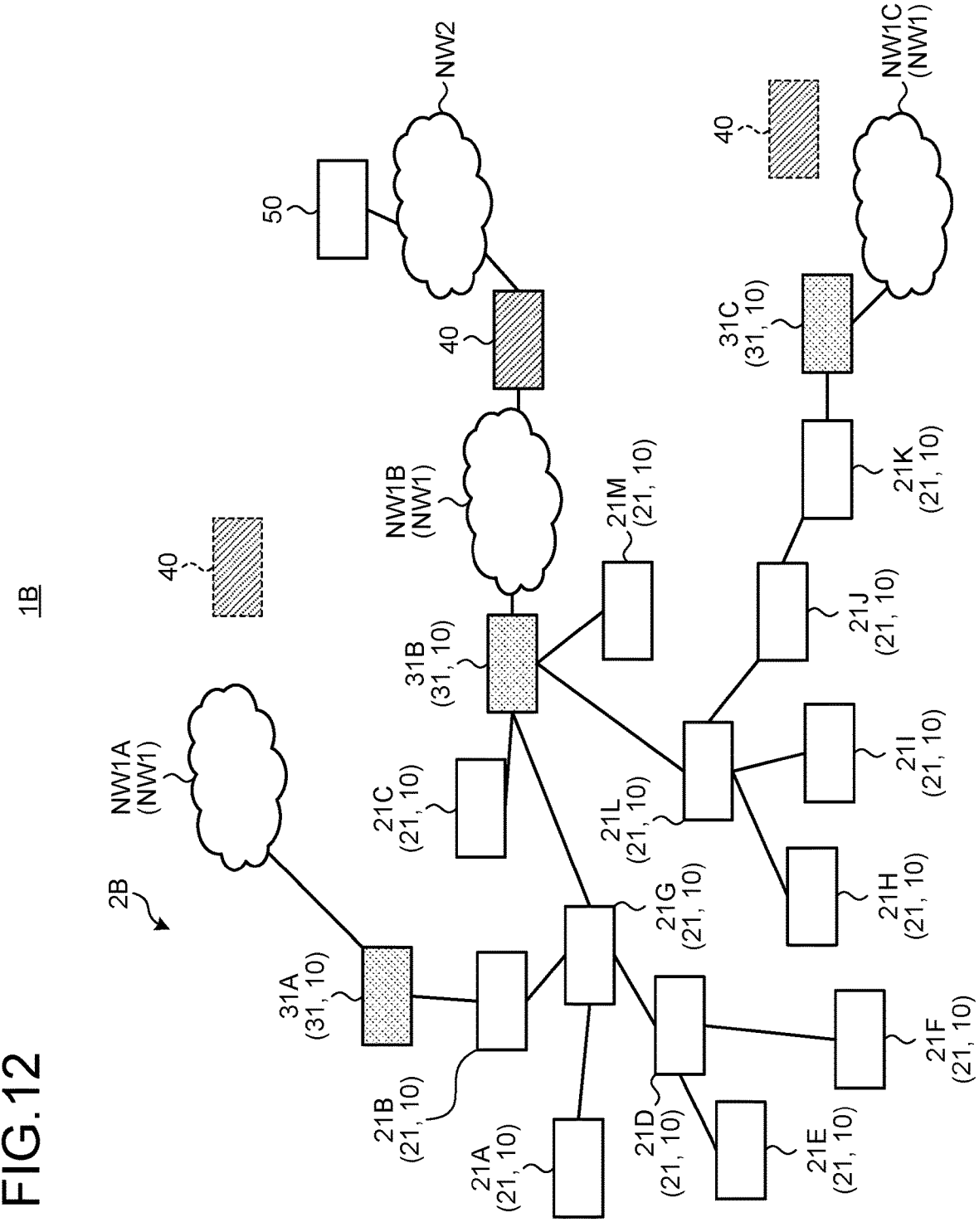
FIG. 12 is a schematic diagram illustrating a communication system according to a modification example.

FIG. 12 is a schematic diagram illustrating an example of a communication system 1B according to a third modification example.

The communication system 1B includes a plurality of nodes 10, the gateway 40, and the server device 50. The gateway 40 and the server device 50 are similar to the embodiment described earlier.

In the third modification example, a plurality of nodes 10 constitutes a multihop network 2B. In the third modification example, the communication system 1B includes first nodes 21 and second nodes 31 as the nodes 10 constituting the multihop network 2B. The first nodes 21 represent an example of first communication devices. The second nodes 31 represent an example of second communication devices.

That is, in the third modification example, as compared to the communication system 1 according to the embodiment described earlier, the communication system 1B includes the first nodes 21 in place of the first nodes 20, and includes the second nodes 31 in place of the second node 30.

In the third modification example, the multihop network 2B includes a plurality of second nodes 31 instead of including a single second node 30. That is, in the third modification example, the explanation is given about an example in which the entry-exit points between the multihop network 2 and the lower-level network NW1 are configured with a plurality of second nodes 31.

In FIG. 12, an example is illustrated such that the multihop network 2B includes three second nodes 31 containing a second node 31A to a second node 31C. Herein, as long as there is a plurality of second nodes 31 in the multihop network 2B, the number of second nodes 31 is not limited to three.

In the present embodiment, the explanation is given about an example in which a plurality of second nodes 31 is connected to mutually different lower-level networks NW1. For example, the explanation is given for an example in which a second node 31A is connected to a lower-level network NW1A, a second node 31B is connected to a lower-level network NW1B, and a second node 31C is connected to a lower-level network NW1C. The lower-level networks NW1A to NW1C are each an example of the lower-level network NW1.

In the third modification example, due to movement of the gateway 40 in the real space, the lower-level network NW1 to which the gateway 40 establishes a connection goes on changing. Moreover, due to the movement of the gateway 40 in the real space, from among the second nodes 31 included in the multihop network 2B, the second node 31 that gets connected to the gateway 40 via the lower-level network NW1 also goes on changing.

In the communication system 1B according to the third modification example, the gateway 40 and the server device 50 perform identical operations to the operations explained in the embodiment described earlier.

The second nodes 31 and the first nodes 21 perform identical operations to the operations performed by the second node 31 and the first nodes 20, respectively, according to the embodiment described earlier. Meanwhile, any second node 31 can transfer the first communication data to another second node 31 that is connected to the lower-level network NW1 to which the gateway 40 is connected. Moreover, any first node 21 can transmit the first communication data to any second node 31 that is connected to the lower-level network NW1 to which the gateway 40 is connected.

Figure 13:
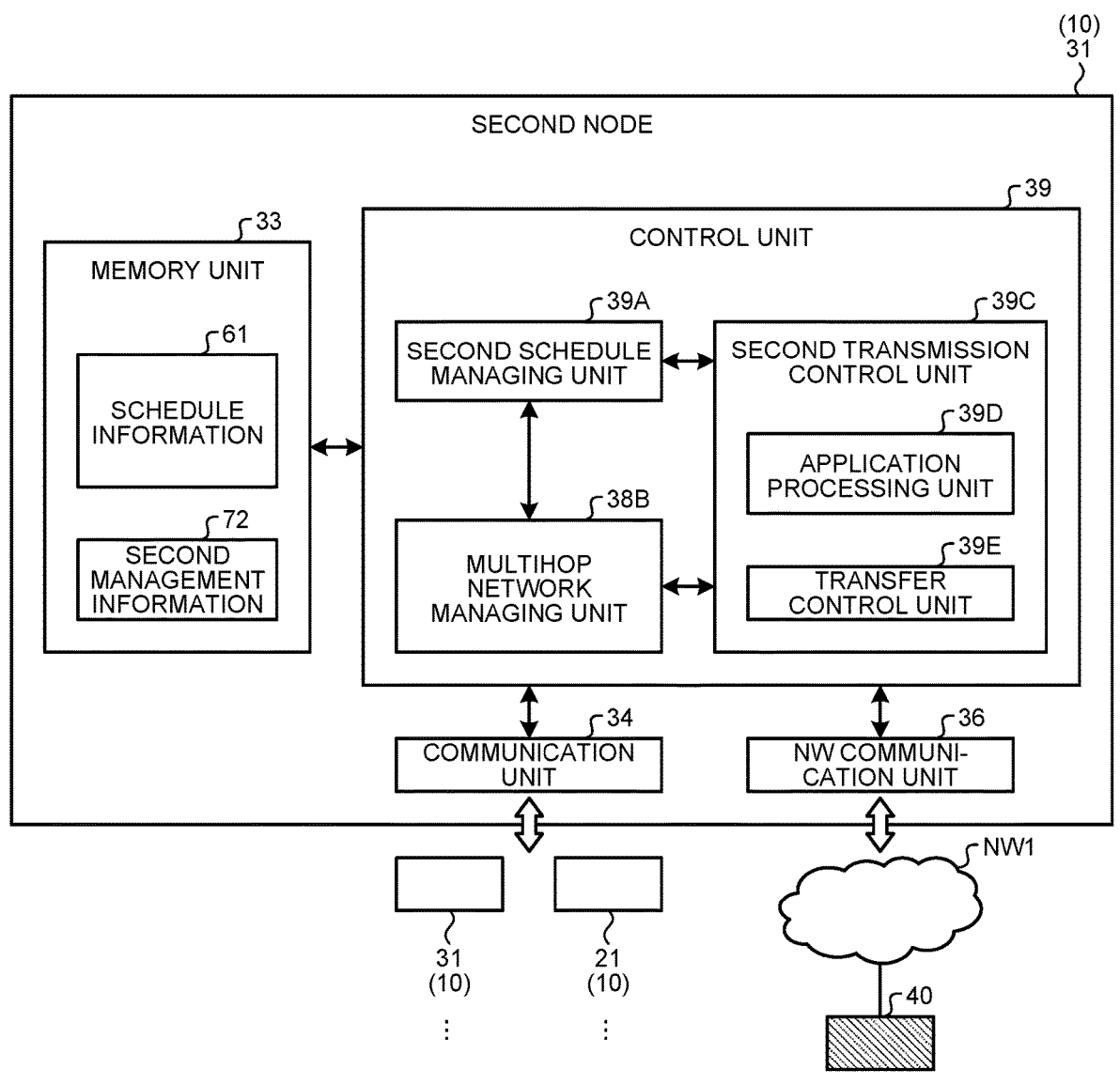
FIG. 13 is a schematic diagram illustrating a functional configuration of a second node according to the modification example.

FIG. 13 is a schematic diagram illustrating an exemplary functional configuration of the second node 31 according to the third modification example.

The second node 31 includes a memory unit 33, a control unit 39, the communication unit 34, and the NW communication unit 36. The memory unit 33, the communication unit 34, the NW communication unit 36, and the control unit 39 are connected to each other in a manner of being able to transmit and receive data and signals. The communication unit 34 and the NW communication unit 36 are similar to the explanation given in the embodiment described above.

The memory unit 33 is used to store a variety of data. In the third modification example, the memory unit 33 is used to store schedule information 61 and second management information 72.

The schedule information 61 represents an example of schedule information The data configuration of the schedule information 61 is similar to the data configuration of the schedule information 64 and the schedule information 66 according to the embodiment described above (see FIG. 6).

That is, in the schedule information 61, the lower-level NW identification information of the lower-level network NW1, with which the gateway 40 can establish a connection, is associated to the communicable-period information indicating the communicable period during which the gateway 40 is present within the communication range enabling communication with the second node 31 via the lower-level network NW1 that is identified by the lower-level NW identification information. The communicable-period information is similar to the explanation given earlier. That is, a second schedule managing unit 39A manages, as the schedule information 61, the information in which one or more sets of communicable-period information, which are specified in the schedule information 60 managed by the second schedule managing unit 38A according to the embodiment described earlier, are held in a corresponding manner also to the lower-level NW identification information.

The second management information 72 is used in managing the lower-level networks NW1 to which the second nodes 31 are connected. In the second management information 72, the identification information of the second nodes 31 is associated to the lower-level NW identification information of the lower-level networks NW1 to which the second nodes 31 identified by the identification information are connected.

The control unit 39 includes a second schedule managing unit 39A, the multihop network managing unit 38B, and a second transmission control unit 39C. Moreover, the second transmission control unit 39C includes an application processing unit 39D and a transfer control unit 39E.

The second schedule managing unit 39A, the multihop network managing unit 38B, the second transmission control unit 39C, the application processing unit 39D, and the transfer control unit 39E are implemented by using, for example, one or more processors.

Herein, except for managing the schedule information 61 instead of managing the schedule information 60, the second schedule managing unit 39A is similar to the second schedule managing unit 38A according to the embodiment described above.

The second transmission control unit 39C performs transmission control with respect to the first communication data and the second communication data in an identical manner to the second transmission control unit 38C according to the embodiment described earlier.

The second transmission control unit 39C includes the application processing unit 39D and the transfer control unit 39E. In an identical manner to the application processing unit 38D according to the present embodiment, the application processing unit 39D processes the application data that is received from some first node 21 and that is addressed to the corresponding second node 31. Moreover, the application processing unit 39D can voluntarily generate first communication data regardless of the reception of application data.

Moreover, when the second communication data for which the corresponding second node 31 represents the final destination is received from the server device 50 via the gateway 40 and the lower-level network NW1, the application processing unit 39D processes that second communication data.

The transfer control unit 39E controls the transfer of the communication data between the first nodes 21 and the server device 50, in an identical manner to the transfer control unit 38E according to the embodiment described earlier. In the third modification example, the transfer control unit 39E also controls the transfer of the communication data between the first nodes 21 and the other second nodes 31.

In the case of transmitting the first communication data, in an identical manner to the second transmission control unit 38C, the second transmission control unit 39C that includes the application processing unit 39D and the transfer control unit 39E adjusts the transmission timing of the first communication data on the basis of the schedule information 61. That is, the second transmission control unit 39C adjusts the transmission timing of the first communication data on the basis of the schedule information 61 instead of the schedule information 60.

More specifically, the second transmission control unit 39C reads the schedule information 61 from the memory unit 33. Then, in the communicable period which is indicated by the communicable-period information specified in the schedule information 61, the second transmission control unit 39C transmits the first communication data to the server device 50 via the lower-level network NW1 and the gateway 40.

That is, in the third modification example, during the period of time in which the gateway 40 is not connected to the lower-level network NW1, in an identical manner to the second transmission control unit 38C according to the embodiment described earlier, the second transmission control unit 39C of the concerned second node 31 remains on standby for transmitting the first communication data to the gateway 40. On the other hand, in the communicable period in which the gateway 40 remains connected to the lower-level network NW1, in an identical manner to the second transmission control unit 38C according to the embodiment described earlier, the second transmission control unit 39C performs transmission control to transmit the first communication data to the gateway 40.

Moreover, in the third modification example, the second transmission control unit 39C of the concerned second node 31 can further perform transmission control to transmit the second communication data to the other second nodes 31 connected to the lower-level network NW1 to which the gateway 40 is scheduled to be connected at the at scheduled transmission timing. Herein, the scheduled transmission timing can represent the present timing, or can be an arbitrary timing in near future.

More specifically, in the communicable period which is indicated by the communicable-period information specified in the schedule information 61 corresponding to the lower-level NW identification information of the lower-level network NW1 to which the gateway 40 is scheduled to be connected at the schedule transmission timing, the second transmission control unit 39C of the concerned second node 31 performs transmission control to transmit the first communication data to the server device 50 via the second nodes 31 connected to the same lower-level network NW1, via the same lower-level network NW1, and via the gateway 40.

More specifically, the second transmission control unit 39C identifies, in the schedule information 61, the lower-level NW identification information associated with the communicable period that includes the scheduled transmission timing of the first communication data. Then, the second transmission control unit 39C reads, from the second management information 72, the identification information of the second node 31 corresponding to the identified lower-level NW identification information. In the communicable period indicated by the communicable-period information corresponding to the identified lower-level NW identification information in the schedule information 61, the second transmission control unit 39C performs transmission control to transmit the first communication data to the second node 31 identified by the read identification information.

That is, in the third modification example, the second transmission control unit 39C of the second node 31 can perform transmission control to transmit the first communication data to the other second nodes 31 connected to the lower-level network NW1 to which the gateway 40 is scheduled to be connected at the schedule transmission timing.

The following explanation is given with reference to FIG. 12. For example, assume that the gateway 40 moves through the real space according to the schedule information and establishes a connection with the lower-level network NW1A. Moreover, assume that the second node 31B transmits the first communication data. In that case, in the communicable period in which the gateway 40 remains connected to the lower-level network NW1A, the second transmission control unit 39C of the second node 31B transmits the first communication data to the second node 31A that is connected to the lower-level network NW1A.

Figure 14:
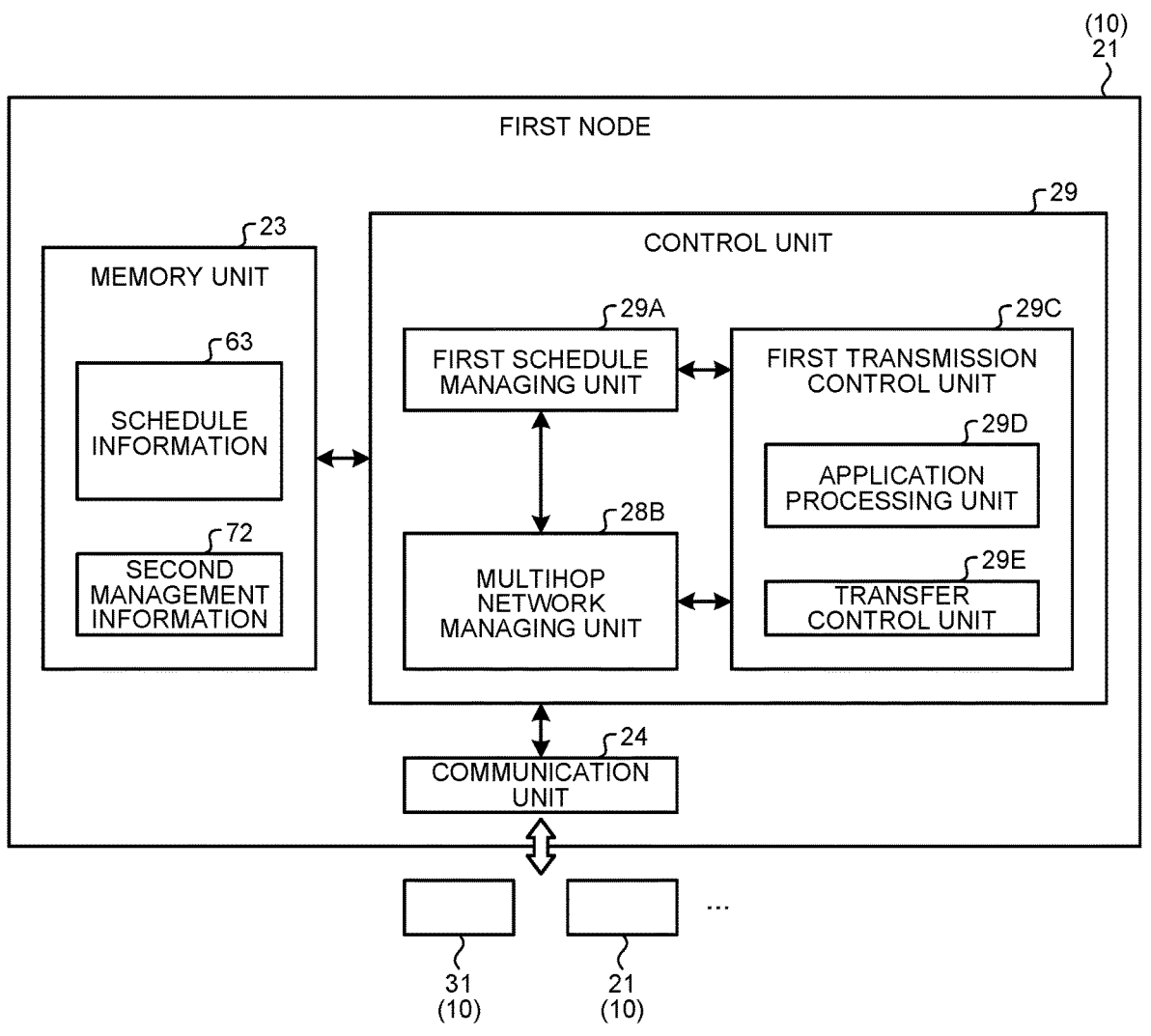
FIG. 14 is a schematic diagram illustrating a functional configuration of a first node according to the modification example.

FIG. 14 is a schematic diagram illustrating an exemplary functional configuration of the first node 21 according to the third modification example.

The first node 21 includes a memory unit 23, a control unit 29, and the communication unit 24. The memory unit 23, the control unit 29, and the communication unit 24 are connected to each other in a manner of being able to transmit and receive data and signals. Herein, the communication unit 24 is similar to the explanation given in the present embodiment.

The memory unit 23 is used to store a variety of data. The memory unit 23 is used to store schedule information 63 and the second management information 72. The second management information 72 is similar to the explanation given earlier.

The schedule information 63 represents an example of schedule information. The data configuration of the schedule information 63 is similar to the data configuration of the schedule information 64 and the schedule information 66 according to the embodiment described earlier (see FIG. 6).

That is, in the schedule information 63, the lower-level NW identification information of the lower-level network NW1, with which the gateway 40 can establish a connection, is associated to the communicable-period information indicating the communicable period during which the gateway 40 is present within the communication range enabling communication with the second nodes 31 via the lower-level network NW1 that is identified by the lower-level NW identification information. The communicable-period information is similar to the explanation given earlier. That is, the control unit 29 (namely, a first schedule managing unit 29A described later) manages, as the schedule information 63, the information in which the lower-level NW identification information is further associated to one or more sets of communicable-period information specified in the schedule information 62 that is managed by the first schedule managing unit 28A according to the embodiment described earlier.

The control unit 29 includes the first schedule managing unit 29A, the multihop network managing unit 28B, and a first transmission control unit 29C. Moreover, the first transmission control unit 29C includes an application processing unit 29D and a transfer control unit 29E.

The first schedule managing unit 29A, the multihop network managing unit 28B, the first transmission control unit 29C, the application processing unit 29D, and the transfer control unit 29E are implemented by using, for example, one or more processors.

Except for managing the schedule information 63 instead of managing the schedule information 62, the first schedule managing unit 29A is similar to the first schedule managing unit 28A according to the embodiment described earlier.

The first transmission control unit 29C performs transmission control to transmit the first communication data and the second communication data, in an identical manner to the first transmission control unit 28C according to the embodiment described earlier.

The first transmission control unit 29C includes the application processing unit 29D and the transfer control unit 29E. In an identical manner to the application processing unit 28D according to the embodiment described earlier, the application processing unit 29D processes the application data that is received from some other first nodes 21 or some second node 31 and that is addressed to the corresponding first node 21. Moreover, the application processing unit 29D can voluntarily generate first communication data regardless of the reception of application data.

Moreover, when the second communication data for which the corresponding first node 21 represents the final destination is received from the server device 50 via the gateway 40 and the lower-level network NW1, the application processing unit 29D processes that second communication data.

The transfer control unit 29E controls the transfer of the communication data between the other first nodes 21 and the server device 50, in an identical manner to the transfer control unit 28E according to the embodiment described earlier. In the third modification example, the transfer control unit 29E also controls the transfer of the communication data to the second nodes 31.

In the case of transmitting the first communication data, in an identical manner to the first transmission control unit 28C, the first transmission control unit 29C that includes the application processing unit 29D and the transfer control unit 29E adjusts the transmission timing of the first communication data on the basis of the schedule information 63. That is, the first transmission control unit 29C adjusts the transmission timing of the first communication data on the basis of the schedule information 63 instead of the schedule information 62.

More specifically, the first transmission control unit 29C reads the schedule information 63 from the memory unit 23. Then, in the communicable period which is indicated by the communicable-period information specified in the schedule information 63, the first transmission control unit 29C performs transmission control to transmit the first communication data to the server device 50 via the lower-level network NW1 and the gateway 40.

That is, in the third modification example, during the period of time in which the gateway 40 is not connected to the lower-level network NW1, in an identical manner to the first transmission control unit 28C according to the embodiment described earlier, the first transmission control unit 29C of the concerned first node 21 remains on standby for transmitting the first communication data to the gateway 40. On the other hand, in the communicable period in which the gateway 40 remains connected to the lower-level network NW1, in an identical manner to the first transmission control unit 28C according to the embodiment described earlier, the first transmission control unit 29C performs transmission control to transmit the first communication data to the gateway 40.

Moreover, in the third modification example, the first transmission control unit 29C of the concerned first node 21 can further perform transmission control to transmit the first communication data to the second nodes 31 connected to the lower-level network NW1 to which the gateway 40 is scheduled to be connected at the at scheduled transmission timing.

More specifically, in the communicable period which is indicated by the communicable-period information specified in the schedule information 63 corresponding to the lower-level NW identification information of the lower-level network NW1 to which the gateway 40 is scheduled to be connected at the schedule transmission timing, the first transmission control unit 29C of the concerned first node 21 performs transmission control to transmit the first communication data to the server device 50 via the second nodes 31 connected to the same lower-level network NW1, via the same lower-level network NW1, and via the gateway 40.

More specifically, the first transmission control unit 29C identifies, in the schedule information 63, the lower-level NW identification information associated to the communicable period that includes the scheduled transmission timing of the first communication data. Then, the first transmission control unit 29C reads, from the second management information 72, the identification information of the second node 31 corresponding to the identified lower-level NW identification information. In the communicable period indicated by the communicable-period information corresponding to the identified lower-level NW identification information in the schedule information 63, the first transmission control unit 29C performs transmission control to transmit the first communication data to the second node 31 identified by the read identification information.

That is, in the third modification example, the first transmission control unit 29C of the concerned first node 21 can perform transmission control to transmit the first communication data to the second nodes 31 connected to the lower-level network NW1 to which the gateway 40 is scheduled to be connected at the schedule transmission timing.

The following explanation is given with reference to FIG. 12. For example, assume that the gateway 40 moves through the real space according to the schedule information and establishes a connection with the lower-level network NW1A.

Moreover, assume that a first node 21E transmits the first communication data to the server device 50 representing the final destination. In that case, in the communicable period in which the gateway 40 remains connected to the lower-level network NW1A, the first transmission control unit 29C of the first node 21E transmits the first communication data to the second node 31A that is connected to the lower-level network NW1A.

As explained above, in the third modification example, the multihop network 2B includes a plurality of second nodes 31. In the communicable period indicated by the communicable-period information corresponding to the lower-level NW identification information of the lower-level network NW1 to which the gateway 40 is scheduled to be connected at the scheduled transmission timing, the second transmission control unit 39C of each second node 31 performs transmission control to transmit the first communication data to the server device 50 via the second nodes 31 connected to the same lower-level network NW1, via the same lower-level network NW1, and via the gateway 40.

Hence, in the communication system 1B according to the third modification example, during the period of time in which the gateway 40 is not connected to the lower-level network NW1, it becomes possible to hold down the transmission of the first communication data from the concerned second node 31 to the lower-level network NW1, thereby enabling holding down unnecessary power consumption.

Thus, the communication system 1B according to the third modification example enables holding down the power consumption.

Given below is the explanation of an exemplary hardware configuration of the nodes 10, the gateway 40, and the server device 50 according to the embodiment and the modification examples described above.

Figure 15:
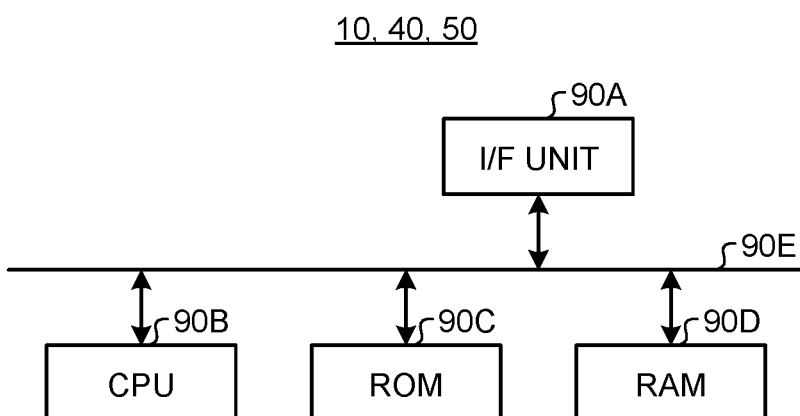
FIG. 15 is a hardware configuration diagram.

FIG. 15 is an exemplary hardware configuration diagram of the nodes 10, the gateway 40, and the server device 50 according to the embodiment and the modification examples described above.

Each of the nodes 10, the gateway 40, and the server device 50 according to the embodiment and the modification examples described above has the hardware configuration of a general-purpose computer that includes a control device such as a central processing unit (CPU) 90B; memory devices such as a read only memory (ROM) 90C and a random access memory (RAM) 90D; an I/F unit 90A representing the interface for various devices; and a bus 90E that connects the constituent elements to each other.

In each of the nodes 10, the gateway 40, and the server device 50 according to the embodiment and the modification examples described above, the CPU 90B reads a computer program from the ROM 90C into the RAM 90D, and executes the computer program so that the corresponding function units get implemented in the computer.

Meanwhile, the computer program meant for implementing the operations performed in each of the nodes 10, the gateway 40, and the server device 50 according to the embodiment and the modification examples described above can be stored in advance in the corresponding ROM 90C.

Alternatively, the computer program meant for implementing the operations performed in each of the nodes 10, the gateway 40, and the server device 50 according to the embodiment and the modification examples described above can be stored as an installable file or an executable file in a computer-readable memory medium such as a compact disc read only memory (CD-ROM), a compact disc recordable (CD-R), a digital versatile disc (DVD), or a flexible disk (FD); and can be provided as a computer program product. Still alternatively, the computer program meant for implementing the operations performed in each of the nodes 10, the gateway 40, and the server device 50 according to the embodiment and the modification examples described above can be stored in a downloadable manner in a computer connected to a network such as the Internet. Still alternatively, the computer program meant for implementing the operations performed in each of the nodes 10, the gateway 40, and the server device 50 according to the embodiment and the modification examples described above can be distributed via a network such as the Internet.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:

a plurality of first communication devices constituting a multihop network; and a second communication device constituting the multihop network in collaboration with the first communication devices, the second communication device being capable of communicating with a server device via a lower-level network and via a gateway being mobile, the server device being connected to a higher-level network, wherein the second communication device includes one or more hardware processors coupled to a memory, the one or more hardware processors being configured to:

manage schedule information containing communicable-period information indicating a communicable period during which the gateway establishes a connection with the second communication device via the lower-level network; and transmit first communication data addressed to the server device, the first communication data being transmitted to the server device via the lower-level network and the gateway in the communicable period indicated by the communicable-period information, each of the plurality of first communication devices is configured to store the schedule information and transmit the first communication data to the server device via the second communication device, the lower-level network, and the gateway in the communicable period indicated by the communicable-period information;

the server device is configured to store the schedule information and transmit second communication data to the second communication device via the gateway and the lower-level network in the communicable period indicated by the communicable-period information, the second communication data being addressed to one of the plurality of first communication devices; and the gateway is configured to store the schedule information and transfer the second communication data to the second communication device via the lower-level network in the communicable period indicated by the communicable-period information.

2. The communication system according to claim 1, wherein the schedule information is generated and distributed in advance by the gateway or the server device.

3. The communication system according to claim 1, wherein the multihop network includes a plurality of the second communication devices.

4. The communication system according to claim 3, wherein the one or more hardware processors of each of the second communication devices are configured to:

manage the schedule information in which lower-level NW identification information and the communicable-period information are associated with one another, the lower-level NW identification information indicating the lower-level network to which the gateway is able to establish a connection, the communicable-period information indicating the communicable period during which the gateway is present within a communication range enabling communication with the second communication device via the lower-level network identified by the lower-level NW identification information; and transmit the first communication data to the server device via the second communication device connected to the lower-level network, via the lower-level network, and via the gateway, the first communication data being transmitted in the communicable period indicated by the communicable-period information specified in the schedule information corresponding to the lower-level NW identification information of the lower-level network to which the gateway is scheduled to connect at a scheduled transmission timing.

5. The communication system according to claim 1, wherein the first communication device has a function for communicating with the second communication device, and does not have a function for communicating with the lower-level network; and the second communication device functions as a concentrator of the multihop network, and transmits the first communication data originating in the first communication device for transmission.

6. A communication device constituting a multihop network in collaboration with a plurality of first communication devices, the communication device being capable of communicating with a server device via a lower-level network and via a gateway being mobile, the server device being connected to a higher-level network, the communication device comprising:

one or more hardware processors coupled to a memory, the one or more hardware processors being configured to:

manage schedule information containing communicable-period information indicating a communicable period during which the gateway establishes a connection with the communication device via the lower-level network; and transmit first communication data addressed to the server device, the first communication data being transmitted to the server device via the lower-level network and the gateway in the communicable period indicated by the communicable-period information, wherein each of the plurality of first communication devices is configured to store the schedule information and transmit the first communication data to the server device via the communication device, the lower-level network, and the gateway in the communicable period indicated by the communicable-period information;

the server device is configured to store the schedule information and transmit second communication data to the communication device via the gateway and the lower-level network in the communicable period indicated by the communicable-period information, the second communication data being addressed to one of the plurality of first communication devices; and the gateway is configured to store the schedule information and transfer the second communication data to the communication device via the lower-level network in the communicable period indicated by the communicable-period information.

7. A communication method implemented by a communication device constituting a multihop network in collaboration with a plurality of first communication devices, the communication device being capable of communicating with a server device via a lower-level network and via a gateway being mobile, the server device being connected to a higher-level network, the communication method comprising:

managing schedule information containing communicable-period information indicating a communicable period during which the gateway establishes a connection with the communication device via the lower-level network; and transmitting first communication data addressed to the server device, the first communication data being transmitted to the server device via the lower-level network and the gateway in the communicable period indicated by the communicable-period information, wherein each of the plurality of first communication devices is configured to store the schedule information and transmit the first communication data to the server device via the communication device, the lower-level network, and the gateway in the communicable period indicated by the communicable-period information;

the server device is configured to store the schedule information and transmit second communication data to the communication device via the gateway and the lower-level network in the communicable period indicated by the communicable-period information, the second communication data being addressed to one of the plurality of first communication devices; and the gateway is configured to store the schedule information and transfer the second communication data to the communication device via the lower-level network in the communicable period indicated by the communicable-period information.

8. A computer program product comprising a non-transitory computer-readable recording medium on which a computer program executable by a computer is recorded, the computer constituting a multihop network in collaboration with a plurality of first communication devices, the computer being capable of communicating with a server device via a lower-level network and via a gateway being mobile, the server device being connected to a higher-level network, the computer program instructing the computer to:

manage schedule information containing communicable-period information indicating a communicable period during which the gateway establishes a connection with the computer via the lower-level network; and transmit first communication data addressed to the server device, the first communication data being transmitted to the server device via the lower-level network and the gateway in the communicable period indicated by the communicable-period information, wherein each of the plurality of first communication devices is configured to store the schedule information and transmit the first communication data to the server device via the computer, the lower-level network, and the gateway in the communicable period indicated by the communicable-period information;

the server device is configured to store the schedule information and transmit second communication data to the computer via the gateway and the lower-level network in the communicable period indicated by the communicable-period information, the second communication data being addressed to one of the plurality of first communication devices; and the gateway is configured to store the schedule information and transfer the second communication data to the computer via the lower-level network in the communicable period indicated by the communicable-period information.

* * * * *